United States Patent
Qi

(10) Patent No.: US 7,313,636 B2
(45) Date of Patent: Dec. 25, 2007

(54) METHODS AND STRUCTURE FOR SUPPORTING PERSISTENT RESERVATIONS IN A MULTIPLE-PATH STORAGE ENVIRONMENT

(75) Inventor: Yanling Qi, Austin, TX (US)

(73) Assignee: LSI Corporation, Milpitas, CA (US)

( * ) Notice: Subject to any disclaimer, the term of this patent is extended or adjusted under 35 U.S.C. 154(b) by 588 days.

(21) Appl. No.: 10/868,554

(22) Filed: Jun. 15, 2004

(65) Prior Publication Data
US 2005/0278465 A1 Dec. 15, 2005

(51) Int. Cl.
G06F 3/00 (2006.01)
G06F 13/00 (2006.01)
(52) U.S. Cl. .................. 710/5; 710/33; 710/38
(58) Field of Classification Search ............ None
See application file for complete search history.

(56) References Cited

U.S. PATENT DOCUMENTS 6,286,056 B1 * 9/2001 Edgar et al. ............. 710/5
2003/0065782 A1 * 4/2003 Nishanov et al. ......... 709/226
2004/0030822 A1 * 2/2004 Rajan et al. ............. 711/4
2005/0228924 A1 * 10/2005 Marushak et al. ........ 710/300

* cited by examiner

Primary Examiner—Alan S. Chen
(74) Attorney, Agent, or Firm—Duft, Bornsen & Fishman LLP

(57) ABSTRACT

A persistent reservation emulation structure to emulate exclusive reservation SCSI-3 protocol features in a host system having multiple paths to a storage device. An enhanced multiple-path driver layer (or other processing elements) provide emulation of persistent reservation commands directed from a host system to a storage device. The driver does not forward exclusive type reservations to the storage device but rather emulates the desired exclusive operations on the systems behalf using only non-exclusive reservation types. The emulated reservation handling enables parallel use of multiple paths between a host system and a storage device to improve reliability and/or performance of the storage device.

19 Claims, 12 Drawing Sheets

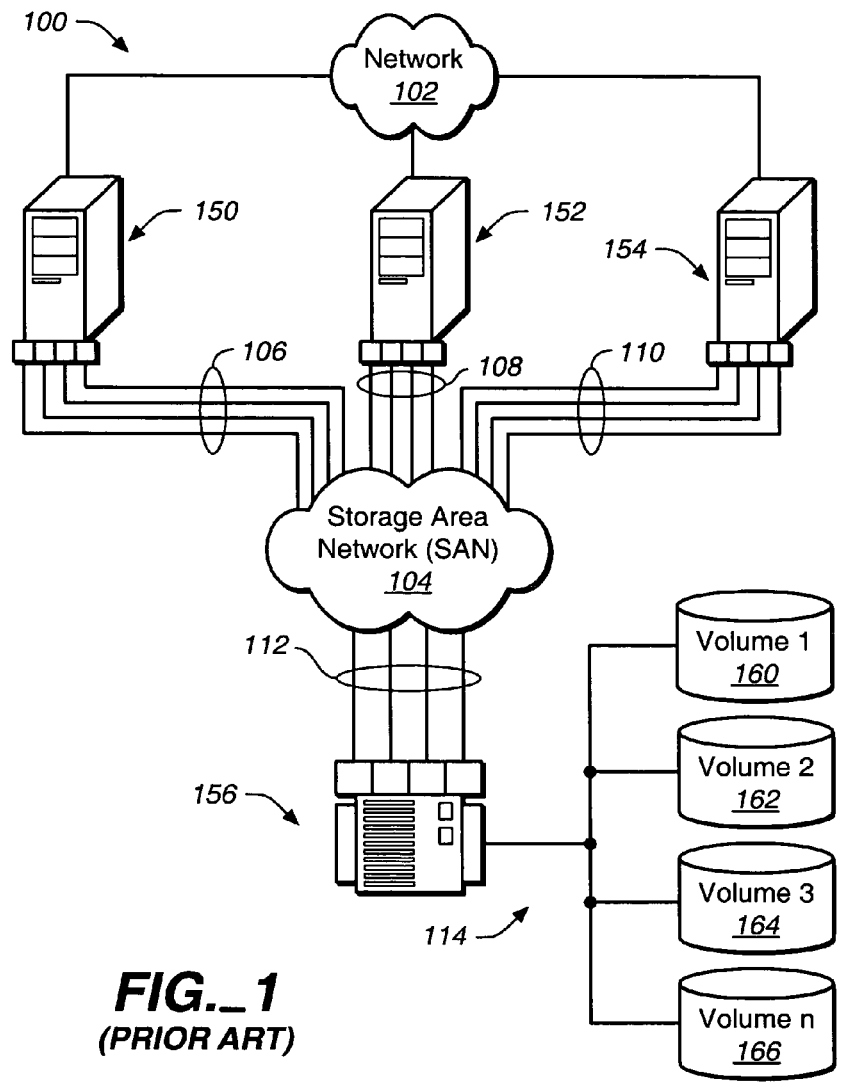
FIG._1
(PRIOR ART)
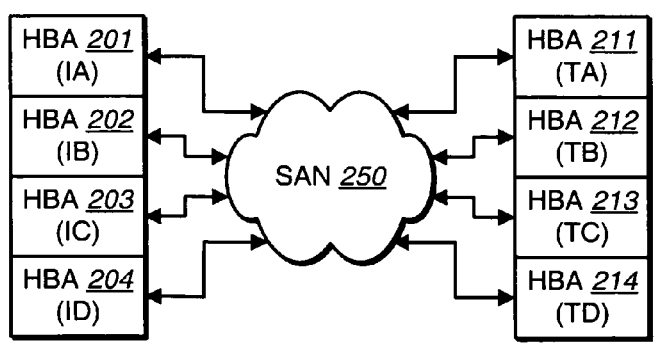
FIG._2
(PRIOR ART)

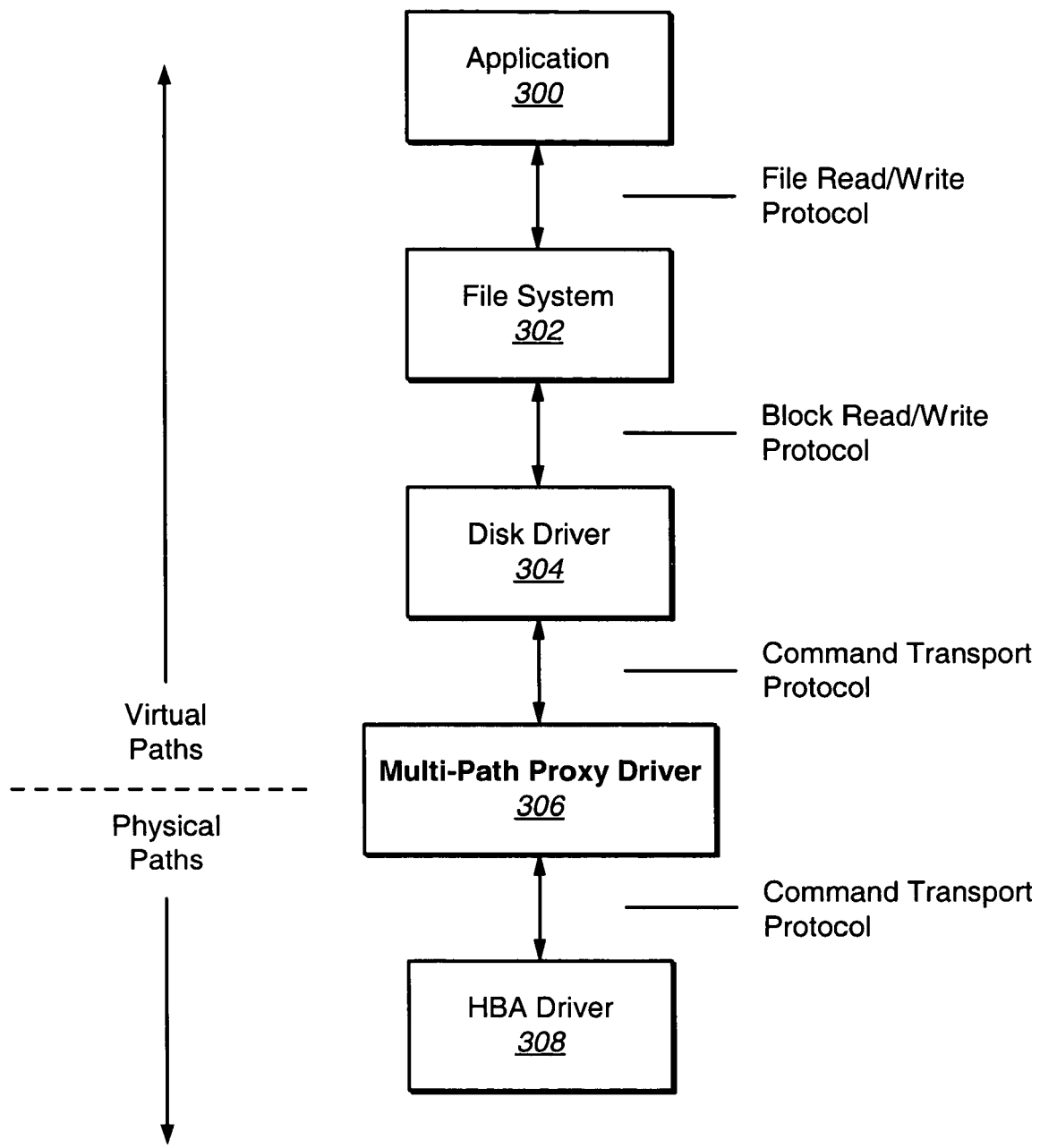
FIG._3
*(PRIOR ART)*

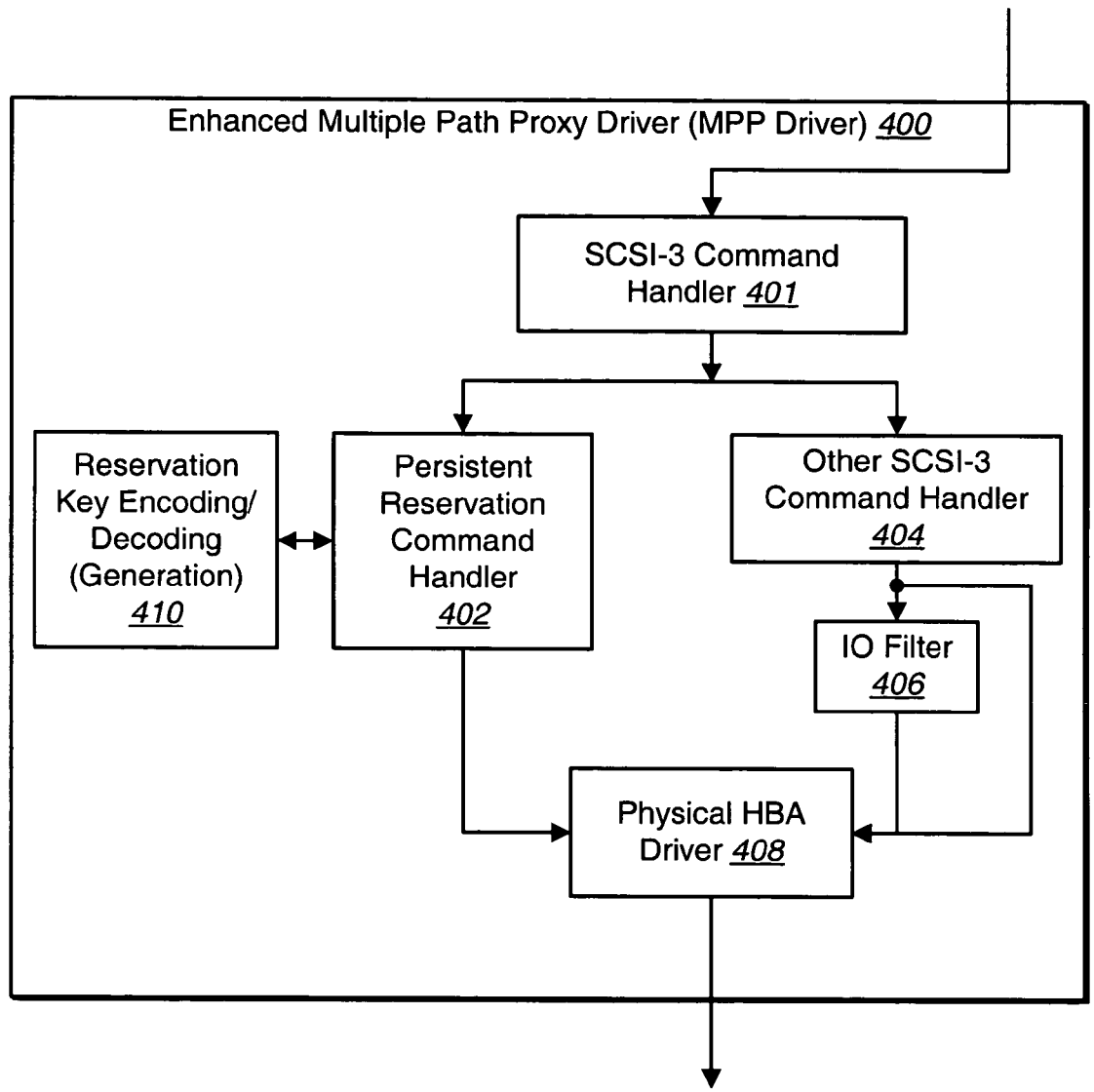
FIG._4

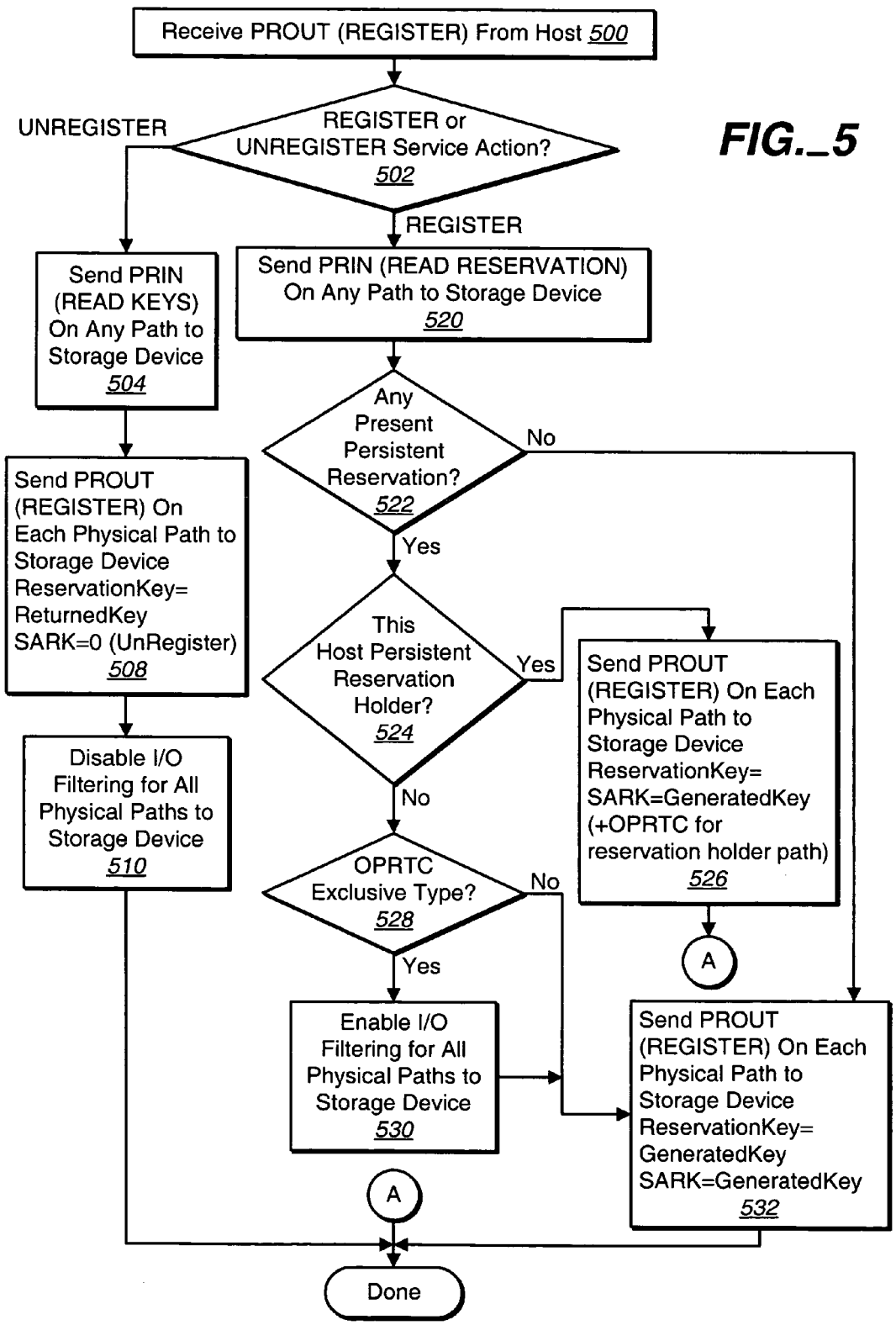
FIG._5

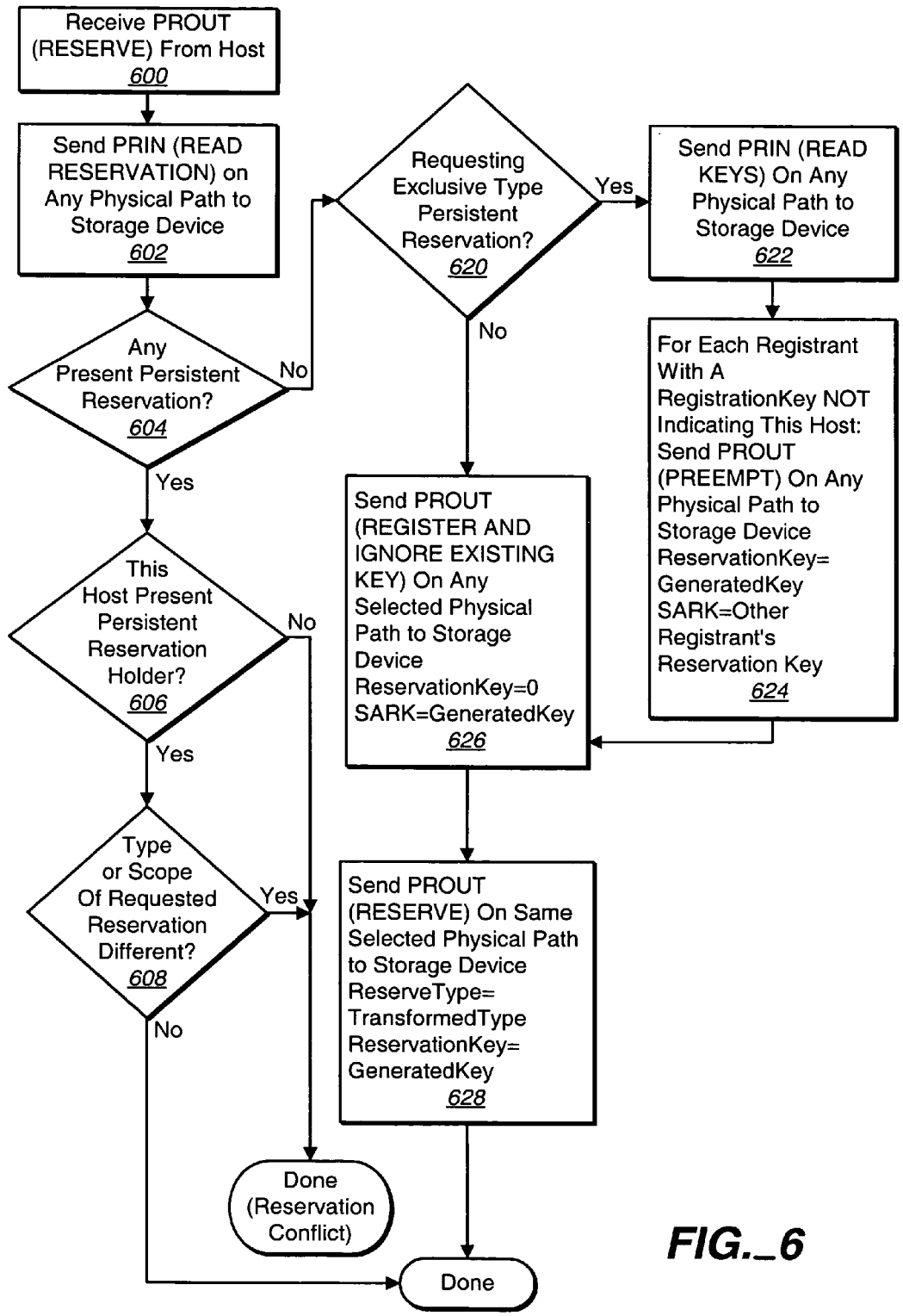
FIG._6

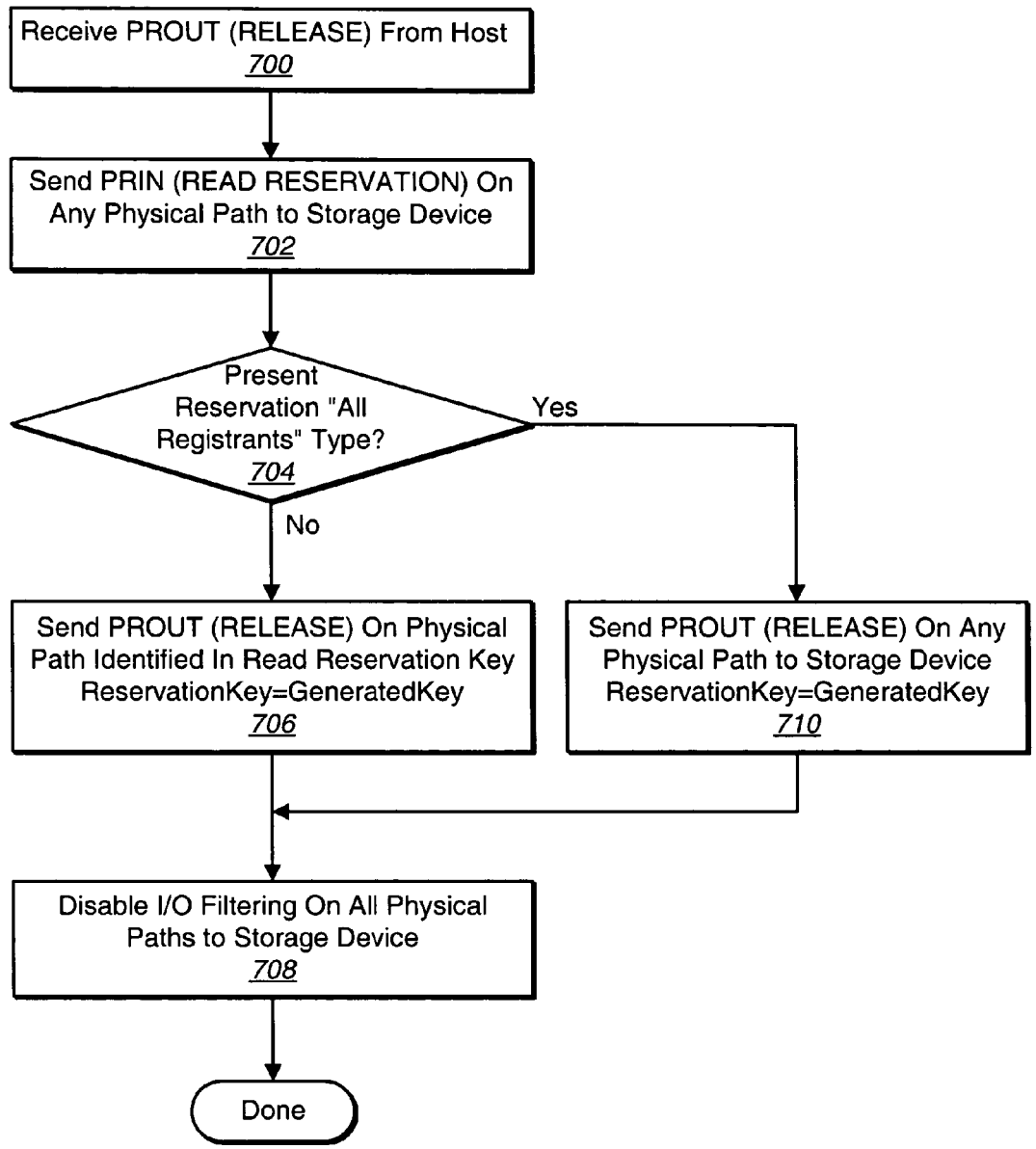
FIG._7

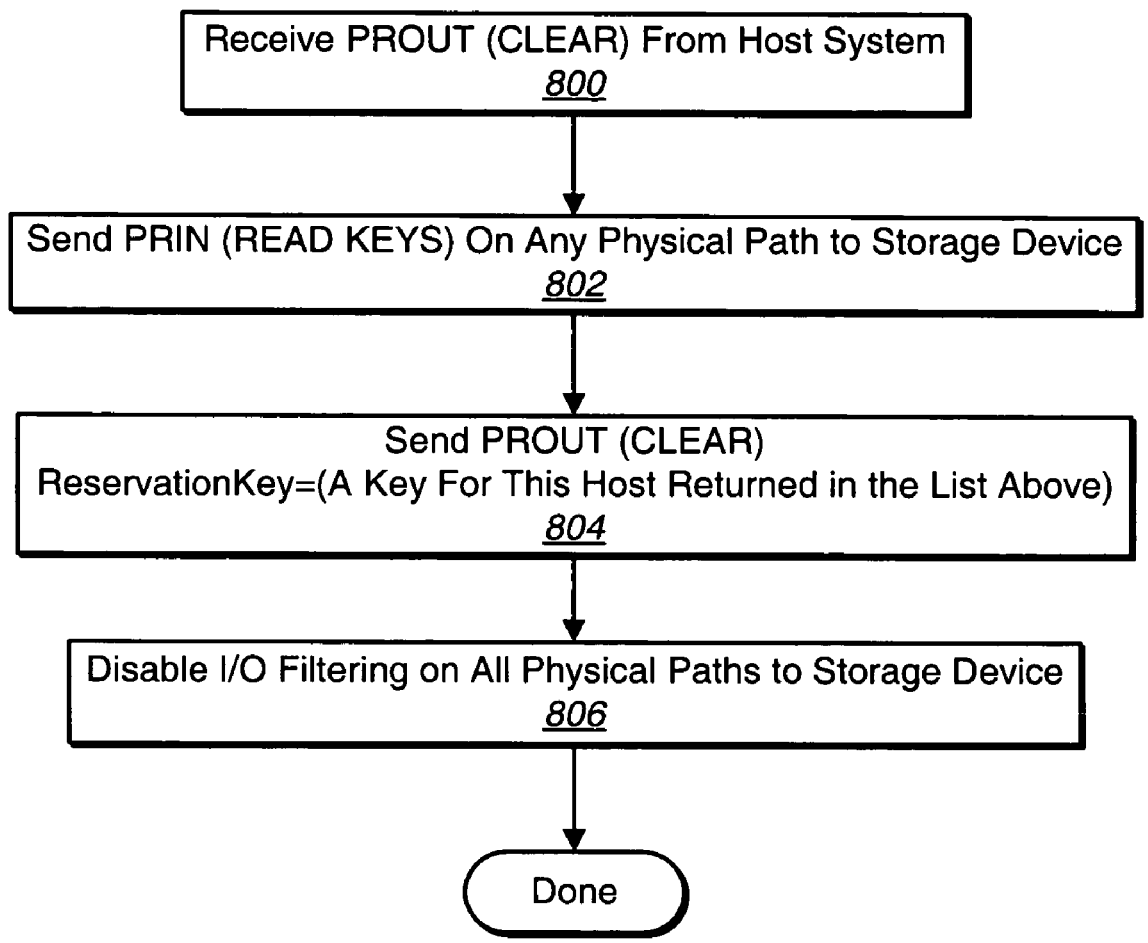
FIG._8

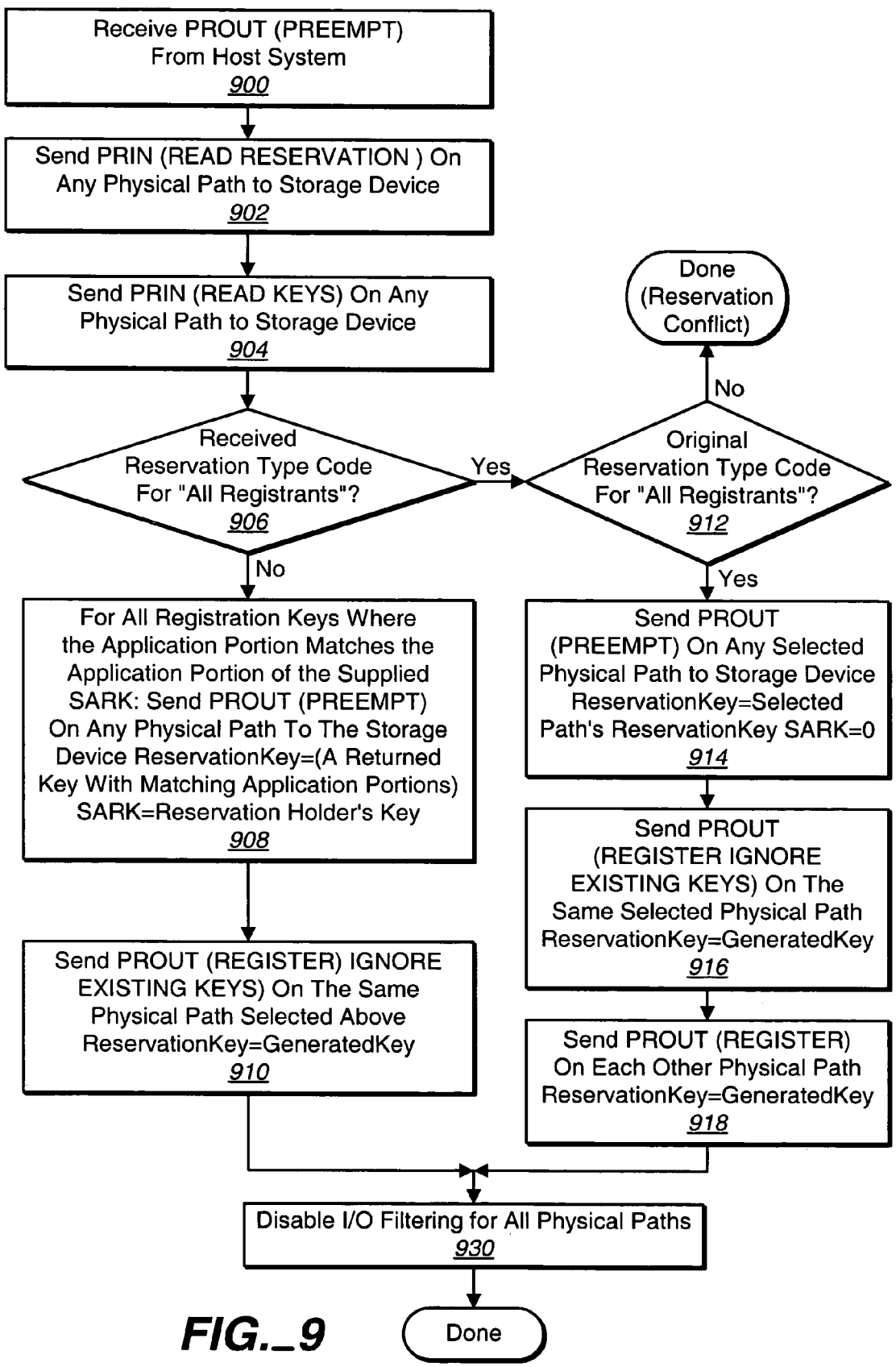
FIG._9

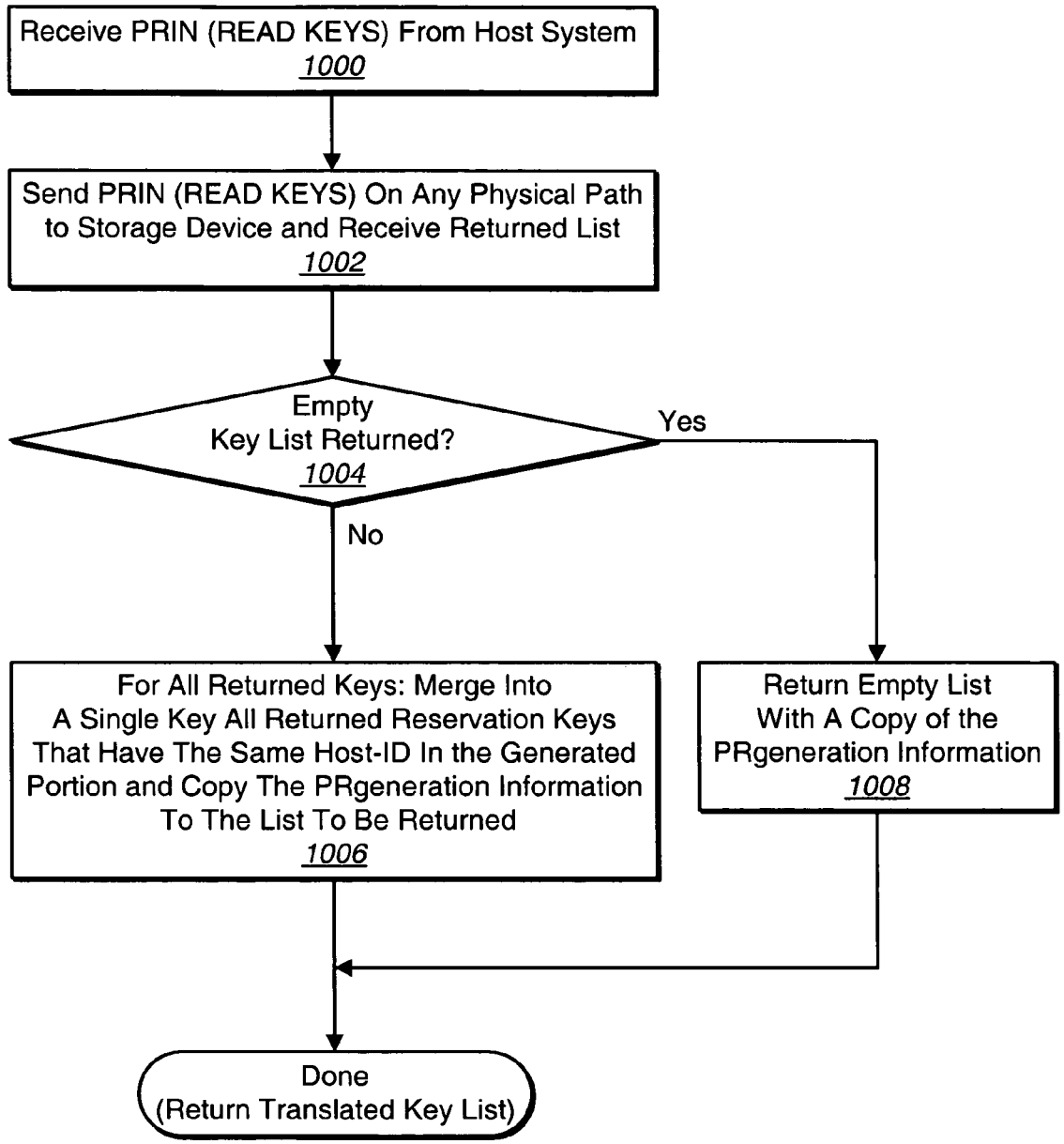
FIG._10

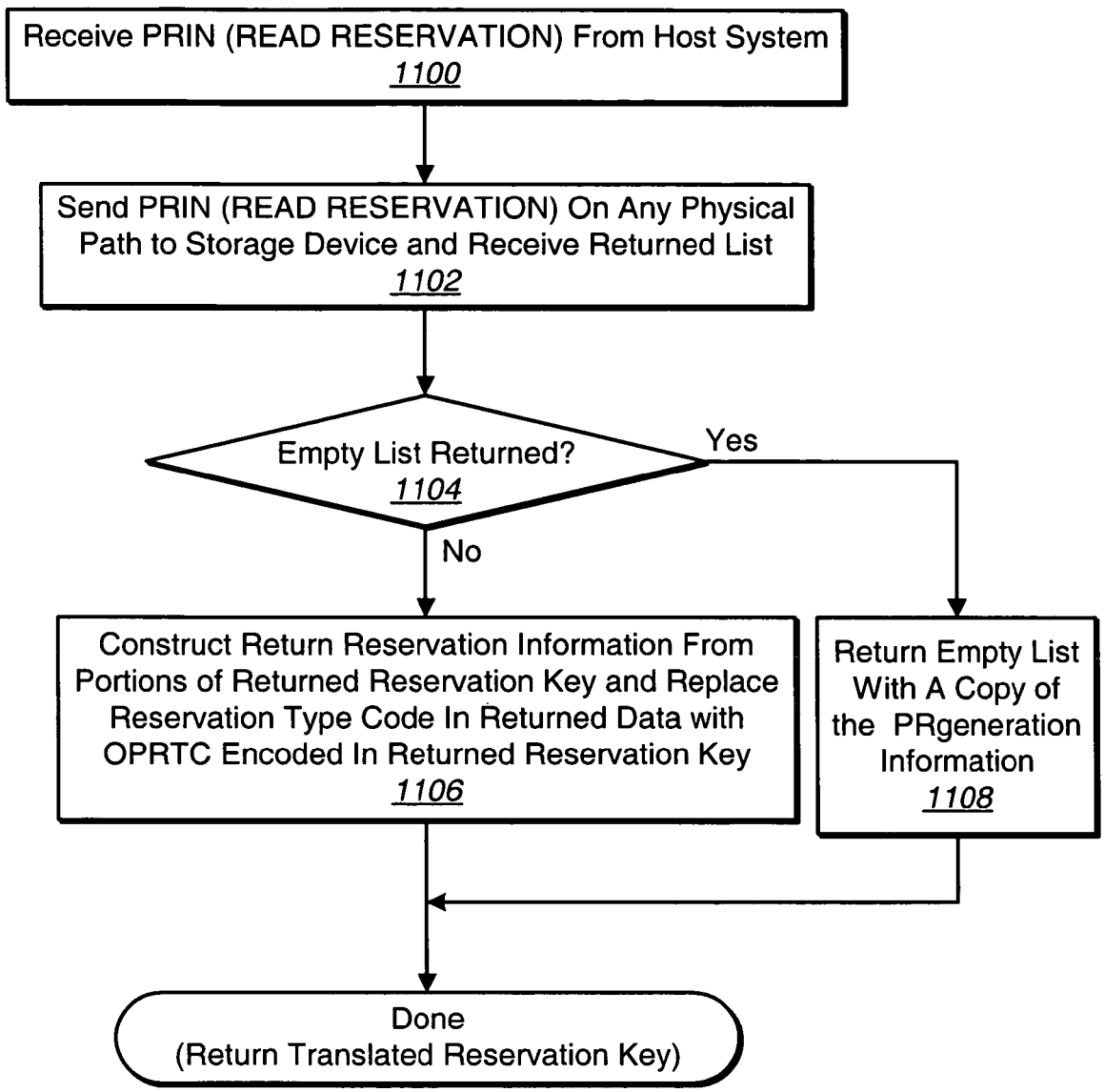
FIG._11

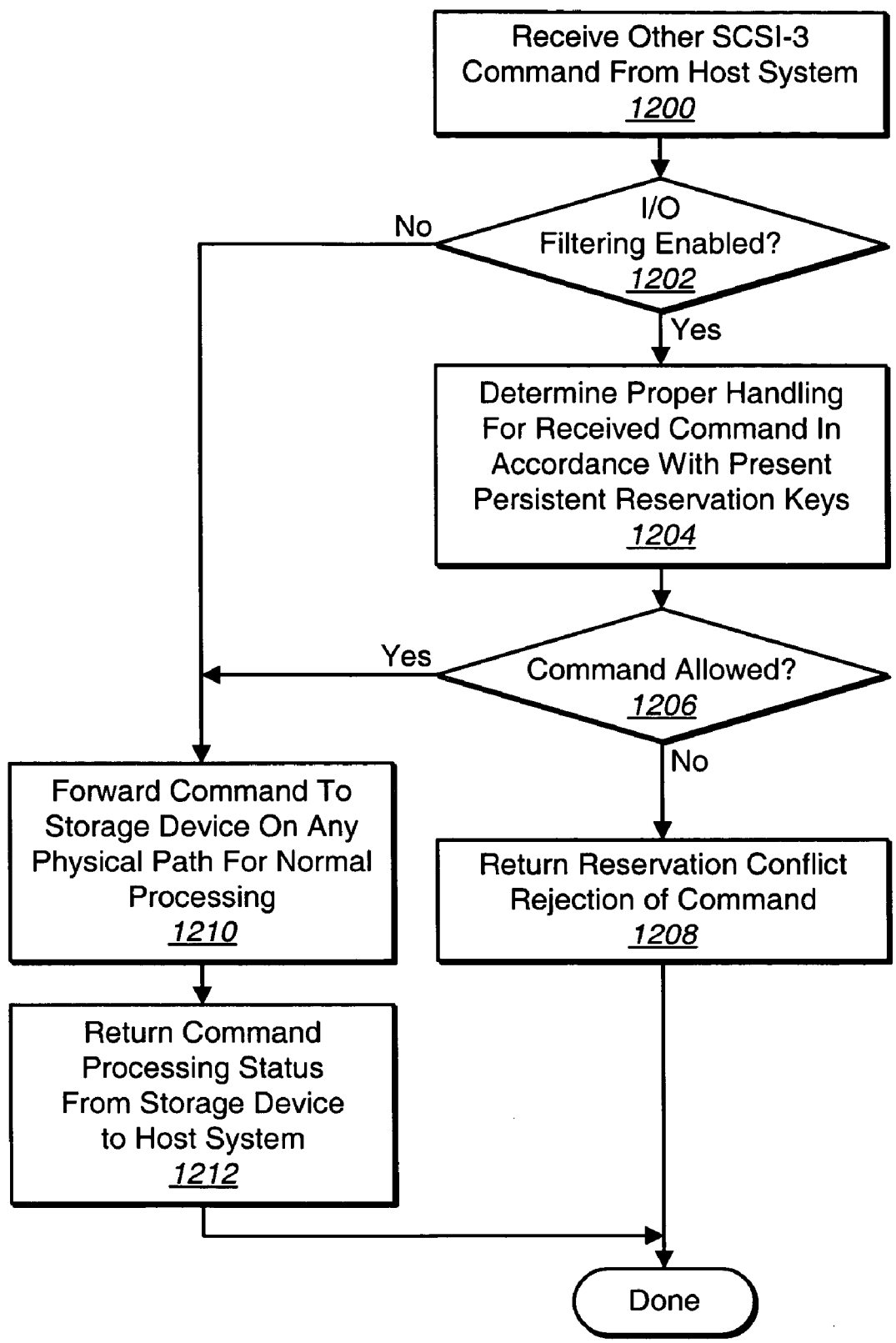
FIG._12

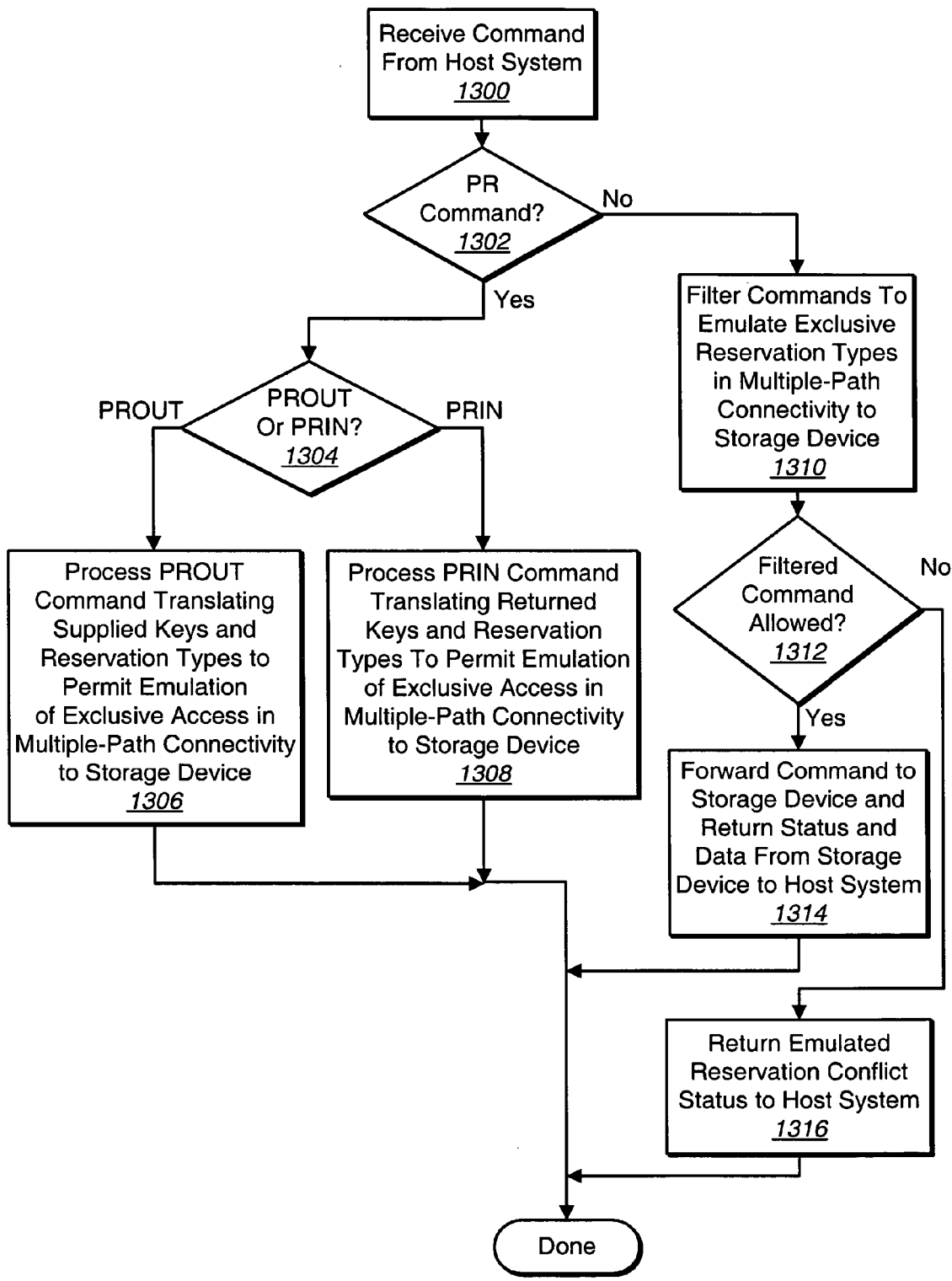
FIG._13

METHODS AND STRUCTURE FOR SUPPORTING PERSISTENT RESERVATIONS IN A MULTIPLE-PATH STORAGE ENVIRONMENT

BACKGROUND OF THE INVENTION

1. Field of the Invention

The invention relates generally to storage and computer system interconnections and more specifically relates to methods and structures to support SCSI-3 Persistent Reservations in a multiple-path storage/computing cluster.

2. Related Patents

This patent is related to commonly owned patent application Ser. No. 10/635,887 filed on Aug. 6, 2003 and entitled METHODS AND STRUCTURE FOR SCSI2 TO SCSI3 RESERVATION PROTOCOL MAPPING which is hereby incorporated by reference. This patent is also related to commonly owned patent application Ser. No. 09/960,827 filed on Sep. 21, 2001 and entitled METHOD AND APPARATUS FOR PROVIDING HIGHLY-TRANSPARENT, HOST-BASED MULTI-PATHING SUPPORT which is hereby incorporated by reference.

3. Discussion of Related Art

It is generally known in the art of high availability and mission critical computing that data loss or even temporarily unavailable data is unacceptable. In such critical environments, a computer host system may utilize multiple host bus adaptors to access data from storage devices that, in turn, provide high availability performance through use of redundant controllers each receiving data through a corresponding interface adapter. In such high availability and high performance environments, it is a goal that the risk of a single-point-of-failure is eliminated. Data previously stored in the storage array is still accessible in case of hardware component, connection, or cable failures.

A host system in FIG. 1 can access the same data volume of the storage array via multiple data paths. SCSI (small computer system interface) is a standard that has been widely applied to interconnections between host systems and storage devices. SCSI-3 is the common version of the SCSI standards presently utilized in such connections. The SCSI standards define a command and status exchange protocol as well as some of the many transport media over which such protocol exchanges may be conducted. Those of ordinary skill in the art are well versed in the SCSI standards including the SCSI-3 standards. In particular, the SCSI-3 SBC and SBC-2 standards define standard block commands typically supported by any storage device adhering to the SCSI-3 standards. Further, published copies of the various SCSI standards are readily available to the public including draft versions freely available at, for example, the "www.t10.org" web site.

Each data path in FIG. 1 is a combination of I_T nexus, in which I represents the initiator port of the host system and T represents the target port of the storage array. An initiator port, in general, initiates an exchange in the SCSI protocols. The exchange is addressed to a particular target device that responds to the initiator. Some devices can serve both as a target and as an initiator in different exchanges.

To the host system, a volume in the storage array appears as multiple storage devices (disks)—each device corresponding to an I_T nexus usable to reach the storage device. This creates difficulties for a host application to access storage devices. Since a volume (also frequently referred to as a logical unit or LUN) of a storage array appears as multiple storage devices (or device nodes), a host must somehow determine which of the possible multiple paths to use. For example in FIG. 2, a host system may include multiple host bus adapters (HBAs) operating as initiators such as IA, IB, IC and ID. Each of the initiator HBAs of the host is coupled through a SAN fabric to a storage device. An exemplary storage device may have multiple HBAs itself operating as target devices (TA, TB, TC and TD). Therefore, in the exemplary configuration of FIG. 2, a system may be confronted with sixteen possible paths between the host system and the storage device each represented by an I_T nexus as follows: IA_TA, IA_TB, IA_TC, IA_TD, IB_TA, IB_TB, IB_TC, IB_TD, IC_TA, IC_TB, IC_TC, IC_TD, ID_TA, ID_TB, ID_TC, and ID_TD. The host system must therefore select among these multiple logical paths and coordinate exchanges with the storage device via the multiple possible paths.

A multiple-path driver element is generally known to address this problem of selecting from among multiple paths to a storage device. A multiple-path driver, such as LSI Logic's Multiple-path-Proxy (MPP) driver architecture, creates a virtual storage device (or virtual data path) for each storage volume and hides the physical storage devices (or data paths) from the operating system and application programs. The physical data access paths are only visible to the MPP driver and the rest of the operating system and applications see only the virtual data paths. Details of the MPP driver architecture are discussed in LSI Logic's above identified, commonly owned, co-pending patent applications.

When an I/O request is directed to a virtual device defined by the MPP, the MPP driver selects a physical path to the storage device and routes the I/O request to the selected physical path to complete the IO request. If a selected physical data path fails or previously failed, the MPP driver may re-route I/O requests through any of the other available physical data paths to the volume.

The LSI Logic MPP driver's logical operation and relation to other elements of an application program and operating system (OS) is generally illustrated in FIG. 3. The MPP driver may be statically or dynamically linked with the operating system. Once so configured, all physical paths to storage array devices are hidden from the software system elements that are above the MPP driver layer as shown in FIG. 3. In particular, the OS and host application layers manipulate only virtual devices that are defined by the MPP driver as illustrated in FIG. 3.

The multiple-path environment MPP proxy driver addresses the problem of single-point-of-failure for accessing storage devices. If one physical path from a host system to a storage device fails, another physical path between the system and the storage device may be selected. Further, the MPP proxy driver may redefine or re-map the virtual paths to other physical paths to thereby hide the failure from the higher layers of the OS and application programs.

Use of multiple-paths between a host system and a storage device therefore improves both performance and reliability. Performance is improved in that the host may perform I/O load balancing by distributing the I/O requests through multiple physical paths. The operations may therefore be completed using parallel operation of multiple paths. Reliability is improved in that if a physical path fails, the host system (i.e., the MPP driver) may use other physical paths to access data.

In such "clustered" computing environments wherein one or more host systems each utilize multiple physical paths coupled to a shared storage device, it is important to coordinate the access to the storage device to assure mutual exclusivity of access to the storage device when needed.

Without such coordination data may be corrupted and/or lost by I/O operations forwarded to the storage device on different physical paths. One common approach to protect the shared data is to use the SCSI-3 Persistent Reservation commands specified in SCSI-3 specifications (SPC3). This technique is sometimes referred to as "I/O fencing using SCSI-3 Persistent Reservation". SCSI-3 Persistent Reservation commands provide for managing/controlling data access to shared storage devices. SCSI-3 Persistent Reservation commands allow a storage device to execute commands from a selected set of I_T nexuses (i.e., a defined set of associated initiator ports and target ports) and reject commands from I_T nexuses outside the selected set. The host systems and cooperating storage devices uniquely identify I_T nexuses using protocol specific mechanisms and parameters.

Application clients (i.e., application programs or the operating system) may add or remove I_T nexuses from the selected set using Persistent Reservation commands. The application clients must all cooperate in use of the reservation protocols and commands. If the application clients do not cooperate in the reservation protocol, data may be unexpectedly modified or lost and/or deadlock conditions may occur. The multiple clients use key values to identify a reservation to be managed. The storage device receives the key value in various Persistent Reservation commands and internally associates the supplied key value with the I_T nexus from which it is received.

As noted above, the essential function of an MPP driver is to make multiple physical paths to a storage device transparent to host applications and the operating system. The host applications and operating system are not aware of the existence of multiple physical paths and treat a storage device with multiple data access paths in essentially the same way as a classic single path storage device. However, as noted above, SCSI-3 Persistent Reservation commands manage reservations in accordance with identified initiator and target ports (I_T nexus). A reservation is owned by a reservation holder or holders identified by an associated physical path I_T nexus. Access permission to a logical unit or its extents (i.e., a portion of a storage device) is managed based on an initiator's registration key. Both a reservation holder and a registrant are associated with a particular I_T nexus. Registration and reservation keys are used and associated with an I_T nexus—i.e., associated with a particular physical path.

When an MPP driver is used in a host system, the MPP driver virtualizes multiple physical paths and presents a single virtual path per disk array volume. When an application program or operating system manages reservations using SCSI-3 Persistent Reservation command, it is not aware of the physical paths since they are virtualized by a multiple-path driver. Referring for example to FIG. 2, when an application client sends a SCSI-3 "Persistent Reservation Out" command with REGISTER service action code parameter to a virtual device for establishing a registration, the command will be sent via an arbitrary, selected physical access path, for example the IA_TA nexus or the IB_TD nexus. The application client will then send a "Persistent Reservation Out" command with a RESERVE service action code parameter to create a Persistent Reservation. The multiple-path driver may select another physical path to complete "reserve" command (such as the IB_TB nexus). Because the next selected path (i.e., IB_TB) is not registered as an I_T nexus permitted access, the storage device will reject the request with SCSI-3 Reservation Conflict status. In other words, the MPP driver element hides the physical paths from the application and operating system processes and therefore complicates the use of SCSI-3 Persistent Reservation protocols.

It is evident from the above discussion that an ongoing problem persists in utilizing SCSI-3 Persistent Reservation protocols and commands in conjunction with a multiple-path driver element in one or more host systems providing virtualized access to multiple physical paths between the host systems and a shared storage device.

SUMMARY OF THE INVENTION

The present invention solves the above and other problems, thereby advancing the state of the useful arts, by providing structures and methods for emulating exclusive type persistent reservations without forwarding exclusive reservation requests to the storage device. Emulating the desired SCSI-3 exclusive reservation semantic enabled parallel use of multiple paths between the host system and the storage device to improve reliability and/or performance of the storage device.

One feature hereof therefore provides a system comprising: at least one host system such that each host system has multiple SCSI-3 I/O adapters serving as SCSI-3 initiators for coupling the corresponding host system to a storage system and such that the multiple SCSI-3 I/O adapters define multiple physical paths between the corresponding host system and a storage system; at least one process operable on each of the at least one host system such that each process is adapted generate a host system request to exchange information with a storage system and such that the hosts system request uses virtual path information substantially devoid of information regarding the multiple physical paths; and a multiple-path driver element configured within each of the at least one host system and coupled to each process to map virtual path information into physical path information for a selected physical path of the multiple physical paths and such that the multiple-path driver is further adapted to transparently coordinate SCSI-3 Persistent Reservation operations by all processes operable on all host systems of the system.

Another aspect hereof further provides that the multiple-path driver element further comprises: a reservation key translation element to encode and/or decode reservation keys used by the multiple-path driver element in coordinating SCSI-3 Persistent Reservation operations such that a translated reservation key includes a process specific portion supplied by the process and includes a generated portion generated by the reservation key translation element.

Another aspect hereof further provides that the multiple-path driver element further comprises: a Persistent Reservation command processing element to process a received SCSI-3 Persistent Reservation command using a translated reservation key in coordinating SCSI-3 Persistent Reservation operations.

Another aspect hereof further provides that the Persistent Reservation command processing element further comprises: a Persistent Reservation type code translation element to modify a supplied Persistent Reservation type code in the host system request to permit coordination of multiple physical paths between the corresponding host system and the storage system.

Another aspect hereof further provides that the Persistent Reservation command processing element further comprises: a Persistent Reservation registration key translation element to modify the supplied Persistent Reservation registration key in a host system request to permit coordination of multiple physical paths between the corresponding host system and the storage system.

Another aspect hereof further provides that the Persistent Reservation registration key translation element is adapted to replace a portion of the supplied Persistent Reservation registration key with a generated portion that includes: a host system identifier identifying the host system that generated the host system request; a path identifier identifying a selected physical path of the multiple physical paths corresponding to the host system request; and an original Persistent Reservation type code identifying the supplied Persistent Reservation type code.

Another aspect hereof further provides that the multiple-path driver element further comprises: a command filter processing element to process received SCSI-3 commands, other than received SCSI-3 Persistent Reservation commands, in coordinating SCSI-3 Persistent Reservation operations.

Another aspect hereof further provides that the command filter processing element further comprises: a target command filter emulation element to emulate rejection of received SCSI-3 commands by a SCSI-3 target device in accordance SCSI-3 Persistent Reservation protocols.

Another feature hereof provides a method operable in a host system having multiple physical paths coupling it to a storage system, the method comprising: receiving SCSI-3 commands from a process in the host system directed to the storage system over an identified path of the multiple physical paths; processing received SCSI-3 Persistent Reservation commands to coordinate SCSI-3 Persistent Reservation commands generated by the process applied to any of the multiple possible physical paths; and filtering other received SCSI-3 commands to emulate operation of the SCSI-3 Persistent Reservation protocol for all physical paths between the host system and the storage device.

Another aspect hereof further provides that the step of processing further comprises: translating between a supplied Persistent Reservation registration key supplied in a SCSI-3 command received from the process and a generated key used in exchanges between a host system and a storage system.

Another aspect hereof further provides that the step of translating further comprises: generating a generated key from an application portion of a supplied Persistent Reservation registration key and from a generated portion such that the generated portion includes: a host system identifier identifying the host system that generated the SCSI-3 command; a path identifier identifying a selected physical path of the multiple paths of the host system request; and an original Persistent Reservation type code identifying the Persistent Reservation type code supplied in the received SCSI-3 command.

Another aspect hereof further provides that the step of processing further comprises: receiving a SCSI-3 PROUT command from the process; translating the supplied Persistent Reservation registration key into the generated key; substituting the generated key in the SCSI-3 PROUT command; converting an original service type code in the SCSI-3 PROUT command from an exclusive service type code to a corresponding non-exclusive service type code; and forwarding the SCSI-3 PROUT command modified by the substitution and conversion to the storage system.

Another aspect hereof further provides that the step of processing further comprises: substituting exclusive Persistent Reservation service code types for non-exclusive service code types in received SCSI-3 Persistent Reservation commands; and forwarding received SCSI-3 Persistent Reservation commands with the substituted service code type to the storage system.

Another aspect hereof further provides that the step of processing further comprises: receiving a SCSI-3 PRIN command from the process; translating the supplied Persistent Reservation registration key into the generated key; substituting the generated key in the SCSI-3 PRIN command; forwarding the SCSI-3 PRIN command modified by the substitution to the storage system; receiving the requested information from the storage system; converting the received information according to the substituted key information; and returning the converted information to the process.

BRIEF DESCRIPTION OF THE DRAWINGS

FIG. 1 is a block diagram of a typical network storage enterprise.

FIG. 2 is a block diagram showing additional details of connectivity as in FIG. 1 among SCSI initiators and SCSI targets coupled through a SAN fabric.

FIG. 3 is a diagram depicting a layered software architecture incorporating a multi-path proxy driver.

FIG. 4 is a block diagram of a multi-path driver software layer enhanced in accordance with features and aspects hereof.

FIG. 5 is a flowchart describing a method in accordance with features and aspects hereof to intercept and process host system PROUT REGISTER service action requests.

FIG. 6 is a flowchart describing a method in accordance with features and aspects hereof to intercept and process host system PROUT RESERVE service action requests.

FIG. 7 is a flowchart describing a method in accordance with features and aspects hereof to intercept and process host system PROUT RELEASE service action requests.

FIG. 8 is a flowchart describing a method in accordance with features and aspects hereof to intercept and process host system PROUT CLEAR service action requests.

FIG. 9 is a flowchart describing a method in accordance with features and aspects hereof to intercept and process host system PROUT PREEMPT service action requests.

FIG. 10 is a flowchart describing a method in accordance with features and aspects hereof to intercept and process host system PRIN READ KEYS service action requests.

FIG. 11 is a flowchart describing a method in accordance with features and aspects hereof to intercept and process host system PRIN READ RESERVATION service action requests.

FIG. 12 is a flowchart describing a method in accordance with features and aspects hereof to intercept and process other SCSI-3 commands from a host system.

FIG. 13 is a flowchart describing a method in accordance with features and aspects hereof to intercept and process any SCSI-3 command from a host system to permit coordination of Persistent Reservations in a multi-path storage interface.

DETAILED DESCRIPTION OF THE DRAWINGS

FIG. 1 is a block diagram of a system 100 as presently known in the art in which a plurality of computing systems (150, 152 and 154) may be interconnected through network 102 for exchanging information therebetween. Each host system also includes a plurality of redundant communication links for coupling to storage system 156. In an exemplary system as presently practiced, systems 150, 152 and 154 as well as storage system 156 may be coupled through a storage area network (SAN) 104. Each host system 150, 152 and 154 may provide a plurality of redundant communication paths 106, 108 and 110, respectively, for coupling corresponding host systems to SAN 104. In like manner, storage system 156 may provide redundant communication links 112 for coupling to SAN 104. Storage system 156 may, in turn, utilize communication path 114 (or redundant such communication paths—not shown) for communicating with disk volumes 160 through 166. Disk volumes 160 through 166 may be individual physical disk storage devices and/or logical portions of one or more physical disk drives (i.e., logical units or LUNs).

As noted above, as presently practiced in the art, application programs and operating system processes operable on such a cluster of computing systems 150 through 154 may utilize SCSI-3 communication protocols over multiple physical communication paths between a host system and the storage system. As discussed above, such multiple-paths present difficulties for managing Persistent Reservation protocol aspects of the SCSI-3 protocol standards because the application program or operating system process these must be cognizant of the multiple physical paths so as to properly utilize Persistent Reservation protocols while still allowing multiple physical paths from a host to the storage device to be utilized in parallel and thereby realize the potential performance and reliability benefits.

FIG. 2 shows an exemplary set of host bus adapters (HBAs) as may be present in a host system (HBA 201 through 204) and as may be present in the corresponding storage system (HBA 211 through 214). The various HBAs may be coupled through SAN fabric 250 to permit initiator devices in a host system (HBA 201 through 204) to communicate with a corresponding target device in a storage system (i.e., HBA 211 through 214).

As can be seen in FIG. 2, such an exemplary configuration permits sixteen possible physical communication paths between a host system and a storage system. Each host system HBA (201 through 204) may communicate to each of four HBAs (211 through 214) in the storage system.

If as noted above, when using the SCSI-3 Persistent Reservation features, an application program or operating system process must be aware of such multiple-paths between the host system and a storage system. Careful management of the Persistent Reservation commands may be required by the application program or operating system process to permit multiple-physical paths to be used simultaneously to thereby improve overall system performance.

FIG. 3 is a block diagram showing a common layered software architecture as presently practiced in the art whereby an application program 300 directs file oriented read/write I/O requests to a storage system through a plurality of hierarchically arranged layers of software. A file system layer 302 receives the file oriented requests and translates them into corresponding logical block oriented requests to a logical disk driver layer 304. The logical disk driver layer 304, in turn, may communicate with a multiple-path driver element 306 using a SCSI-3 transport protocol. The multiple-path driver layer 306 then translates the SCSI-3 command information addressed to a virtual path into corresponding SCSI-3 commands for a particular physical path and forwards the commands to the lower level host HBA device driver layer 308 for transmission to the storage device over a selected physical path.

All layers above the multiple-path driver layer 306 reference virtual or logical paths between the host system and a storage system. The multiple-path driver element 306 may then perform appropriate translation of the virtual or logical path information into corresponding physical path information directed to a particular HBA associated with the host system and a particular target HBA associated with the storage device.

As noted above and as presently practiced in the art, the application program or system process 300 must be cognizant of Persistent Reservation operations and the multiple physical paths to allow for desirable overlap and parallel operation of multiple-paths between a particular host system and a storage system. The multiple-path driver element 306 adds another aspect of complexity to this requirement in that the application program or system process 300 may be unaware of the exact configuration of physical paths.

FIG. 4 is a block diagram describing an enhanced multiple path driver element 400 providing features and aspects hereof. Enhanced multiple path driver element 400 may operate in computing environments and configurations similar to those described above with respect to FIGS. 1 through 3. FIG. 4 generally describes the flow of data and commands received from a higher layer software elements such as that described in FIG. 3 and forwarded in a translated form to a next lower layer for transmission to the storage device on a selected physical path.

In general, each SCSI-3 command received from a higher layer of the host system is processed by command handler element 401 to determine an appropriate command handler for coordinating Persistent Reservation processing for multiple physical paths between one or more hoist systems and a shared storage device. Command handler 401 determines what type of SCSI-3 command was received and forwards the command to an appropriate command handler for further processing. SCSI-3 Persistent Reservation commands are forwarded to Persistent Reservation command handler 402 and all other SCSI-3 commands are forwarded to the other command handler 404 for further processing.

SCSI-3 Persistent Reservation command handler 402 interacts with reservation key encoding/decoding (generation) element 410 to generate (i.e., encode or decode) modified or translated reservation keys. As is known in the art, Persistent Reservation commands use reservation key values to identify a particular application or system process and its requested reservation(s). The key values are generally forwarded to the storage device and associated with the I_T nexus (the physical path) from which the associated commands are received by the storage device. In accordance with features and aspects hereof, reservation keys provided by the application or system processes are encoded to generate a "generated key" value useful to coordinate Persistent Reservation command processing for multiple physical paths associated with a host system. The generated keys are then forwarded to the storage device and, when returned from the storage device, decoded to retain important features originally provided by the requesting host system application or system process.

The encoding and decoding (i.e., generation) of translated or modified reservation and registration key values is discussed in further detail herein below. The SCSI-3 Persistent Reservation commands handled by Persistent Reservation command handler element 402 are translated and modified as required to permit coordinated handling of reservation keys for all physical paths of each host system associated with a shared storage device. The modified Persistent Reservation commands are then forwarded to a physical HBA driver element 408 to be transmitted to one or more selected HBAs associated with selected physical path(s) for the Persistent Reservation command processing.

As will be discussed further herein below, the modified Persistent Reservation command processing requires that other SCSI-3 commands handled by other command handler 404 to be filtered to emulate appropriate Persistent Reservation protocol behavior in view of the modified Persistent Reservation commands forwarded to the storage device. In particular, as discussed further herein below, Persistent Reservation requests identifying exclusive access for a particular reservation type code are modified to utilize nonexclusive Persistent Reservation features. The desired exclusivity must therefore be emulated by I/O filter element 406 when handling other (non Persistent Reservation related) commands. In general, I/O filter element 406 rejects other SCSI-3 commands that should be rejected in view of the current state of any Persistent Reservation requested by the host system applications or system processes. Commands to be so rejected are intercepted by I/O filter 406 and an appropriate rejection status is returned to higher level software elements of the host system. Other commands that do not require such rejection in view of current Persistent Reservation state are merely forwarded through physical HBA driver 408 to be applied to an appropriate selected physical path for transmission to the storage device. Further details of processing of I/O filter element 406 are discussed herein below.

Reservation Key Encoding and Decoding

SCSI-3 Persistent Reservation specification provide for an 8 byte reservation key all of which is used as desired by application and system processes (i.e., by the host system or initiator). Features and aspects hereof reserve a portion of a reservation key (e.g., the first 4 bytes) for internal use as defined below of in table 1. An application client (i.e., a system process or application program process—collectively all referred to herein as simply the host system) can use the rest of the reservation key (e.g., the last 4 bytes) to identify reservation registrant and reservation holder in accordance with the desires of the application or system process. In other words, in accordance with features and aspects hereof, a host system provides a reservation key value in its generation of SCSI-3 Persistent Reservation commands but only relies upon a portion of the key value for its intended purposes. The MPP driver is permitted to use the other (reserved) portion for generating (encoding and decoding) other information useful for coordinating use of Persistent Reservation commands over multiple physical paths between a host system and the shared storage device.

TABLE 1

Exemplary Reserved Portion of Translated Reservation Key Format

| Bit<br>Byte | 7 | 6 | 5 | 4 | 3 | 2 | 1 | 0 |
|---|---|---|---|---|---|---|---|---|
| 0 | OPRTC | | | | PATH-ID | | | |
| 1 | host-id | | | | | | | |
| 2 | host-id | | | | | | | |
| 3 | host-id | | | | | | | |

"OPRTC"—is the Original Persistent Reservation Type Code. SCSI-3 specifies 6 Persistent Reservation Types. Features and aspects hereof (discussed further herein below) may translate the original Persistent Reservation type for "write-exclusive and exclusive-access". The OPRTC field therefore is encoded to retain the original "Persistent Reservation Type Code".

"host-id" is used to identify which host a reservation key belongs to. The host-id is used to identify a host node. Each host will have a unique id. Any of several well known values associated with networked computing systems may be used for this identification value including, for example, portions of a network address or a GUID value generated by the host system operating system.

"PATH-ID" is the identification of a physical path in the host system on which the Persistent Reservation command will be forwarded. Features and aspects hereof may use the PATH-ID to identify which physical path of a virtual device a reservation key belongs to.

A reservation key generated in this exemplary format to encode the above exemplary additional information may be referred to herein as a "generated key". The process of creating such a key from a reservation key value received from the application or system process may be referred to herein as encoding, generating or translating. The process extracting information from such a generated key received from a storage device may be referred to herein as decoding or translating.

In general, the reserved information of a generated key is not returned to the host system application or system processes. Key values returned to the higher layer software elements above the enhanced MPP driver layer may preferably have the reserved field portions reset to zeros.

Persistent Reservation Type Transformation

SCSI-3 Persistent Reservation commands support six types of reservation, namely, from more restrictive to less restrictive, "Write Exclusive", "Exclusive Access", "Write Exclusive—Registrants Only", "Exclusive Access —Registrants Only", "Write Exclusive—All Registrants" and "Exclusive Access—All Registrants". The six defined types of reservations are combinations of two basic types—"Write Exclusive" (read shared and write-exclusive) and "Exclusive Access" (both read and write exclusive) and three restriction levels for write-access.

The Persistent Reservation types of: "Write Exclusive" and "Exclusive Access" allow only the present persistent reservation holder to access the reserved data. If an application client reserves data with "Write Exclusive" or "Exclusive Access" through a virtual device, features and aspects hereof interpret the reservation as allowing all physical paths from the requesting host system, but only the physical paths in this host, to access the reserved data. Initiators from other host systems will be excluded from access to the reserved data. Therefore, features and aspects hereof may change the Persistent Reservation type to "Write Exclusive—Registrants Only" or "Exclusive Access—Registrants Only" accordingly. Table 2 below indicates exemplary translation/modification performed by features and aspects hereof to change exclusive access type reservations to non-exclusive types.

TABLE 1

Persistent Reservation Type Replacements

| Reservation Code Type received from an application client | Name | Translated Reservation Code Type issued to the storage device | Name |
|---|---|---|---|
| 1h | Write Exclusive | 5h | Write Exclusive - Registrants only |
| 3h | Exclusive Access | 6h | Exclusive Access - Registrants Only |
| 5h | Write Exclusive - Registrants only | 5h | Write Exclusive - Registrants only |
| 6h | Exclusive Access - Registrants Only | 6h | Exclusive Access - Registrants Only |
| 7h | Write Exclusive - All Registrants | 7h | Write Exclusive-All Registrants |
| 8h | Exclusive Access - All Registrants | 8h | Exclusive Access - All Registrants |

As noted above, the OPRTC field in the generated key may encode the original reservation type in a generated key such that the original reservation type may be determined when needed.

Enhanced MPP Driver Command Handling

FIG. 13 is a flowchart describing operation of an exemplary enhanced MPP driver element. Element 1300 first receives a SCSI-3 command from a higher layer software element of the host system (e.g., from the logical block driver layer and/or the application or system process—all broadly referred to herein for simplicity as the host system). As noted above, such a command applied to the MPP driver typically identifies a single virtual path to the desired storage device. Element 1302 then determines whether the received command is a SCSI-3 Persistent Reservation command. If so, element 1304 next determines whether the received Persistent Reservation command is a PROUT or PRIN command. If the received Persistent Reservation command is a PROUT command, element 1306 is operable to process the PROUT command by appropriately translating supplied keys and reservation types to permit emulation of desired exclusive access in all multiple paths between the requesting host system and the identified storage device. If element 1304 determines that the received Persistent Reservation command is a PRIN command, element 1308 is similarly operable to process the PRIN command translating key values and reservation types to permit emulation of the requested exclusive access through all of the multiple paths connecting the requesting host-system and the identified storage device. Elements 1304 through 1308 therefore process Persistent Reservation commands to provide emulation of desired exclusive access while permitting all of the multiple paths between the requesting host system and an identified storage device to be utilized. Utilization of the multiple paths permits improved performance and reliability while adhering to the semantic meaning of the SCSI-3 Persistent Reservation protocols.

If element 1302 determines that the received SCSI-3 command is not a Persistent Reservation command, element 1310 is operable to filter the received "other" command to appropriately process the other commands in view of the present emulated state of any persistent reservations. In one exemplary embodiment, element 1310 may process the received command by looking in a table structure to determine whether the received command should be allowed or rejected based upon the originally requested type of Persistent Reservation and the particular received command. Such a table is provided in the SCSI-3 specifications readily available to those of ordinary skill in the art. A version of such an exemplary table from the SCSI-3 specifications is shown below. Those of ordinary skill in the art will recognize that as the SCSI-3 specifications evolve, entries in the following exemplary table may be added, deleted or modified. The exemplary table shown below is therefore merely intended as suggestive of a possible table structure useful to describe which commands to allow and which to reject as a reservation conflict. The exemplary table 3 below describes the operation of a actual storage device operating in accordance with the SCSI-3 specifications rather than the operation of an enhanced MPP driver such as may embody features and aspects hereof. None-the-less the table is suggestive to one of ordinary skill in the art of a similar table semantic that may be used in an enhanced MPP driver to emulate similar command filtering features. A table entry of "Allowed" indicates that the corresponding command is allowed in the context of the corresponding persistent reservation state. By contrast, an entry of "Conflict" indicates that the command is not allowed and that an actual SCSI-3 compliant storage device should return a "Reservation Conflict" status in response to the command in the corresponding persistent reservation state.

TABLE 3

Exemplary table for determining allowed and rejected (conflict) commands based on Persistent Reservation status

| | Addressed LU has this type of persistent reservation held by another I_T nexus | | | | |
|---|---|---|---|---|---|
| | From any I_T nexus | From registered I_T nexus | From I_T nexus not registered | | |
| Command | Write Excl | (RR all types) | Excl Access | Write Excl RR | Excl Access - RR |
| ACCESS CONTROL IN | Allowed | Allowed | Allowed | Allowed | Allowed |
| ACCESS CONTROL OUT | Allowed | Allowed | Allowed | Allowed | Allowed |
| CHANGE ALIASES | Conflict | Conflict | Allowed | Conflict | Conflict |
| EXTENDED COPY | Conflict | Conflict | Allowed | Conflict | Conflict |
| INQUIRY | Allowed | Allowed | Allowed | Allowed | Allowed |
| LOG SELECT | Conflict | Conflict | Allowed | Conflict | Conflict |
| LOG SENSE | Allowed | Allowed | Allowed | Allowed | Allowed |

TABLE 3-continued

Exemplary table for determining allowed and rejected (conflict) commands based on Persistent Reservation status

| | Addressed LU has this type of persistent reservation held by another I_T nexus | | | | |
|---|---|---|---|---|---|
| | From any I_T nexus | | From registered I_T nexus | From I_T nexus not registered | |
| Command | Write Excl | | (RR all types) | Excl Access | Write Excl RR | Excl Access - RR |
| MODE SELECT(6)/MODE SELECT(10) | Conflict | Conflict | Allowed | Conflict | Conflict |
| MODE SENSE(6)/MODE SENSE(10) | Conflict | Conflict | Allowed | Conflict | Conflict |
| PREVENT/ALLOW (Prevent = 0) | Allowed | Allowed | Allowed | Allowed | Allowed |
| PREVENT/ALLOW (Prevent <> 0) | Conflict | Conflict | Allowed | Conflict | Conflict |
| READ ATTRIBUTE | Conflict | Conflict | Allowed | Conflict | Conflict |
| READ BUFFER | Conflict | Conflict | Allowed | Conflict | Conflict |
| READ MEDIA SERIAL NUMBER | Allowed | Allowed | Allowed | Allowed | Allowed |
| RECEIVE COPY RESULTS | Conflict | Conflict | Allowed | Conflict | Conflict |
| RECEIVE DIAGNOSTIC RESULTS | Conflict | Conflict | Allowed | Conflict | Conflict |
| REPORT ALIASES | Allowed | Allowed | Allowed | Allowed | Allowed |
| REPORT DEVICE IDENTIFIER | Allowed | Allowed | Allowed | Allowed | Allowed |
| REPORT LUNS | Allowed | Allowed | Allowed | Allowed | Allowed |
| REPORT SUPPORTED OPERATION CODES | Conflict | Conflict | Allowed | Conflict | Conflict |
| REPORT SUPPORTED TASK MANAGEMENT FUNCTIONS | Conflict | Conflict | Allowed | Conflict | Conflict |
| REPORT TARGET PORT GROUPS | Allowed | Allowed | Allowed | Allowed | Allowed |
| REQUEST SENSE | Allowed | Allowed | Allowed | Allowed | Allowed |
| SEND DIAGNOSTICS | Conflict | Conflict | Allowed | Conflict | Conflict |
| SET DEVICE IDENTIFIER | Conflict | Conflict | Allowed | Conflict | Conflict |
| SET TARGET PORT GROUPS | Conflict | Conflict | Allowed | Conflict | Conflict |
| TEST UNIT READY | Allowed | Allowed | Allowed | Allowed | Allowed |
| WRITE ATTRIBUTE | Conflict | Conflict | Allowed | Conflict | Conflict |
| WRITE BUFFER | Conflict | Conflict | Allowed | Conflict | Conflict |

(legend: Key:
LU = Logical Unit,
Excl = Exclusive,
RR = Registrants Only or All Registrants,
<>Not Equal)

If element 1312 determines that the filtered command is allowed in the present Persistent Reservations state, element 1314 is operable to forward the received command to the storage device and to return any appropriate status and data from the storage device to the requesting host system. If element 1312 determines that the filtered command should be rejected in view of the present Persistent Reservation state, element of 1316 is operable to emulate the return of a reservation conflict status to the requesting host system. As noted above, the storage device need not be even informed of the rejected request. Since the storage device is without knowledge of the desired exclusive Persistent Reservations status, element 1316 emulates the required return of a reservations conflict status on behalf of the storage device. The rejected command need not be forwarded to the storage device for further processing.

PROUT Command Handling

The SCSI-3 PROUT command is used to manage persistent reservations for portions of a volume of data and/or an entire volume of data. The amount of data to be reserved is referred to as the "scope" or "extent" of the reservation and the permissions permitted for other I_T nexus to access the reserved data is referred to as above as the type of the reservation. A service action code parameter of the PROUT command is used to identify which of various Persistent Reservation related services are being requested. In general, a host system (i.e., application or system process) sends a PROUT (REGISTER) service action to register the key value associated with the process. A later PROUT (RESERVE) service action establishes the reservation for that process using the previously registered key value. Other service actions are used to CLEAR, RELEASE, and PREEMPT previously established reservations.

Features and aspects hereof, as noted above, translate the type and keys used in such PROUT service actions to emulate the desired exclusivity while only forwarding non-exclusive access service requests to the storage device. Thus features and aspects hereof emulate the desired exclusivity by intercepting PROUT commands and translating and processing them appropriately to provide desired exclusivity as well as the desired improvements enabled by multiple paths between a host system and a storage device. FIGS. 5-9 are flowcharts describing methods operable in an enhanced MPP driver to provide the desired emulation by processing PROUT commands received from a host system (i.e., from an application or system process operable on the host system).

FIG. 5 is a flowchart describing a method in accordance with features and aspects hereof to process a PROUT Persistent Reservation command with a service action code of REGISTER. A REGISTER service action request registers an initiator with the Persistent Reservation service of a storage device (i.e., registers the supplied key value as associated with the I_T nexus from which the request is received). The REGISTER service action includes a registration key value supplied by the requesting host system. Parameter values supplied with the REGISTER service action request may also indicate that the request is for unregistration of a previously registered initiator.

Element 500 is first operable to receive the Persistent Reservation PROUT command with a REGISTER service action code. Element 502 then determines from the parameters of the PROUT command whether the REGISTER service action is requesting registration of a new initiator or unregistration of a previously registered initiator. If element 502 determines that unregistration of a previously registered initiator is requested, element 504 is operable to generate and transmit a Persistent Reservation PRIN command with a READ KEYS service action for application to the storage device. The PRIN Persistent Reservation command may be forwarded on any of the available physical paths coupling the host system to the storage device. Processing of element 504 also receives the returned information from the storage device indicating a list of known registered keys. Element 506 is next operable to generate and transmit to the storage device a Persistent Reservation PRIN command with a READ RESERVATION service action requesting return of information regarding the present reservation holder (if any). The PRIN command may be forwarded to the storage device on any available physical path coupling the host system to the storage device. The returned information indicating the present reservation holder (if any) is received by processing of element 506. The key information returned the operation of element 504 and the reservation information returned by operation of element 506 identify the registered key and reservation key used for all paths of the requesting host system. Using the returned key, element 508 then generates and transmits a PROUT REGISTER service action on each physical path between the requesting host system and the storage device using the returned reservation key and a service action reservation key (SARK) parameter of zero (indicating a request to unregister). Thus, the registration keys previously used to register all paths are unregistered by operation of elements 504 and 508. Lastly, element 510 disables further I/O filtering of other SCSI-3 commands for all physical paths between the requesting host device host system and the storage device. If I/O filtering was previously enabled in response to a requested exclusive reservation (as discussed further below), I/O filtering would have been previously enabled and is thus disabled by operation of element 510.

If element 502 determines that the received PROUT request is for a register operation, element 520 first generates and transmits on any path to the storage device a PRIN Persistent Reservation command with a READ RESERVATION service action. Information regarding the present reservation (if any) is then returned by operation of element 520. Element 522 then determines whether the returned reservation information indicates that a Persistent Reservation is presently in place. If element 522 determines that no Persistent Reservation is presently in place, element 532 is operable to generate and transmit a PROUT command with a REGISTER service action on each physical path between the requesting host system and storage device. The reservation key and service action reservation key parameters supplied in the generated PROUT is a generated key generated in accordance with the discussion above. The generated key sent on each path is identical but for the path identifier field as discussed above. Thus, each of the multiple paths from the host system to the storage device are registered with the same key value (but for the path ID portion).

If element 522 determines that some Persistent Reservation is presently in place, element 524 next determines whether the requesting host is the present persistent reservation holder. An application may wish to change its registered key for any reason known only to the application. A PROUT command with a REGISTER service action code or a REGISTER AND IGNORE EXISTING KEY service action code may be used by the application for this purpose. The PROUT command processing features of this FIG. 5 therefore emulate processing for such a change of registration key.

The reservation key returned from the read reservation service of element 520 will indicate whether the present persistent reservation holder is associated with this requesting host (i.e., by the host ID field of the returned, generated key). If so, element 526 is then operable to generate and transmit a PROUT Persistent Reservation request with a REGISTER service action on each physical path connecting the requesting host system to the storage device. The reservation key and service action reservation key in the REGISTER service request will be a generated key as discussed above but substituting the original persistent reservation type code (OPRTC) from the present reservation holder's reservation key. In other words, a new reservation key is substituted for the present requesting host system as the current reservation holder. However, the original Persistent Reservation type code generated from the earlier reservation request will be retained in this new generated key. Those skilled in the art will recognize that a REGISTER AND IGNORE EXISTING KEY service action code may also be used in the PROUT command transmitted by element 526.

If element 524 determines that the requesting host is not the present persistent reservation holder, element 528 determines whether the received reservation type code (that supplied in the request received by operation of element 500) indicates a request for an exclusive type reservation. If not, element 532 is operable as discussed above to generate and send a PROUT Persistent Reservation command with a REGISTER service action on each path between the requesting host and the storage device. If element 528 determines that the requested reservation is for exclusive type access, element 530 is first operable to enable I/O filtering within the enhanced MPP driver for all paths between the requesting host system and the storage device. As noted above, enabling I/O filtering permits the MPP driver element to emulate the requested exclusive access though the storage device is never informed of the need for such exclusivity. Element 532 is then operable as above to transmit an appropriate PROUT REGISTER service action on each path between the requesting host and the storage device.

FIG. 6 is a flowchart describing operations of a method in accordance with features and aspects hereof to intercept and process a Persistent Reservation RESERVE service action request from the host system. In the SCSI-3 Persistent Reservation protocols, following a REGISTER service action request, a process may generate a RESERVE service action request to indicate its desire to coordinate access to the shared storage device. As noted above, SCSI-3 Persistent Reservation protocols provide for both exclusive and non-exclusive forms of reserved access. Processing of this FIG. 6 emulates the exclusive access capabilities defined by SCSI-3 Persistent Reservation protocols to permit continued use of multiple-paths from the requesting host system.

Element 600 is first operable to receive the PROUT Persistent Reservation command with a RESERVE service action from the host system. Element 602 then transmits a Persistent Reservation PRIN READ RESERVATION service action to the storage device on any available physical path. The READ RESERVATION service action returns the reservation key for the current holder (if any) of a Persistent Reservation. Element 604 then determines whether the returned information indicates any current holder of a Persistent Reservation. If there is some current holder of a Persistent Reservation, element 606 is next operable to determine whether the requesting host system is the present holder of a Persistent Reservation. The reservation key returned by operation of element 602 may indicate by its generated/encoded key (as discussed above) that the present host owns the current Persistent Reservation. If element 606 determines that the requesting host is not the current regulation holder, the received RESERVE service action request is completed with a Reservation Conflict status returned to the requesting host system. If element 606 determines that the requesting host is also the current reservation holder, element 608 next determines whether the type of reservation and scope of the requested reservation is different than that of the presently held reservation. Again, the information returned by the Read Reservation operation of element 602 indicates the present scope and type of the reservation held by the requesting host. If the new reservation request attempts to change the type or scope, the requested reservation is completed with a Reservation Conflict status returned. Otherwise, the requested reservation is completed with a normal completion status returned.

If element 604 determines that there is no current holder of a Persistent Reservation, element 620 next determines whether the newly requested reservation is requesting a non-exclusive type of Persistent Reservation. If not, element 626 is next operable to transmit a PROUT Persistent Reservation command with a REGISTER AND IGNORE EXISTING KEY service action on any physical path from the host system to storage device. The reservation key parameter should be zero and the service action reservation key (SARK) should be a generated/encoded key in accordance with the encoding discussed above. Element 626 thereby registers the new generated key as being associated with the requesting host system overriding any previous registered key. Element 628 is next operable to send a PROUT Persistent Reservation command with a RESERVE service action on the same physical path selected and utilized by operation of element 626. The reservation type parameter of the RESERVE service action request should be translated or transformed as discussed above to utilize non-exclusive reservation type codes. The reservation key associated with the RESERVE service action is generated in accordance with discussion presented above.

If element 620 determines that the requested Persistent Reservation is an exclusive type of reservation, element 622 is first operable to transmit a PRIN Persistent Reservation command with a READ KEYS service action on any selected physical path to the storage device. Presently registered keys are returned to the MPP driver in response to the request of element 622. Element 624 is then operable for each registration key returned in the list obtained by operation of element 622. For each key in the returned list that does not indicate an association with the presently requesting host system, a PROUT Persistent Reservation command with a PREEMPT service action is transmitted on any physical path to the storage device. The reservation key associated with the PREEMPT service action is a key generated in accordance with the above discussion. The service action reservation key parameter for the PRIN request is the other registrant's reservation key retrieved in the list returned by operation of element 622. Element 624 is therefore operable iteratively on all keys returned by operation of element 622 that do not indicate association with this presently requesting host system. Element 626 and 628 are then operable as discussed above to transmit a PROUT REGISTER AND IGNORE EXISTING KEY service action and a RESERVE service action on some selected path between the requesting host system and the storage device.

Processing a FIG. 6 therefore emulates the reservation protocols of SCSI-3 Persistent Reservation without forwarding an exclusive type reservation request to the storage device. Rather, the exclusive type reservation requests are intercepted and emulated by features of the enhanced MPP driver in accordance with features and aspects hereof.

FIG. 7 is a flowchart showing processing associated with features and aspects hereof in response to receipt of a Persistent Reservation RELEASE service action request from a host system. Following a reservation request, a host may subsequently release a previously requested reservation to enable other users of the shared storage device to proceed with their required access to the shared storage device. Element 700 is first operable to receive a PROUT Persistent Reservation command with a RELEASE service action from a host system. Element 702 than sends a PRIN Persistent Reservation command with a READ RESERVATION service action over any selected physical path to the storage device. The returned information indicates the reservation key and other information regarding the current Persistent Reservation holder (if any). Element 704 then determines whether the type code of the presently held reservation indicates an "All Registrants" type. If so, element 710 is operable to transmit a PROUT Persistent Reservation command with a RELEASE service action on any physical path to the storage device. The reservation key parameter of the RELEASE service action is a generated key in accordance with the discussion above. If the presently held reservation is not an "All Registrants" type of reservation code, element 706 is operable to transmit a PROUT Persistent Reservation command with a RELEASE service action over the physical path identified in the reservation key returned by element 702 above. The reservation key transmitted with the RELEASE service action is a key generated in accordance with the discussion above. In both cases, element 708 is then operable to disable further I/O filtering on all physical paths of the storage device in response to Release of the presently held Persistent Reservation.

FIG. 8 is a flowchart describing a method of operation in accordance with features and aspects hereof to clear a previously granted reservation. Element 700 is first operable to receive a Persistent Reservation PROUT command with a CLEAR service action from the host system. Element 802 is then operable to transmit a PRIN Persistent Reservation command with a READ KEYS service action on any selected physical path between the host system and the storage device. The storage device responds by returning a list of all known registered keys. Element 804 then transmits a PROUT Persistent Reservation command with a CLEAR service action. The command may be transmitted on any selected physical path between the host system and the storage device. The reservation key parameter of the CLEAR service action is a key for this host ID selected from the list of keys retrieved by operation of element 804.

Element 806 then disables further I/O filter processing on all physical paths between the host system and storage device. Having so cleared the Persistent Reservation (if any) held by the requesting host system, no further I/O filtering need be performed within the MPP driver of this requesting host system.

FIG. 9 is a flowchart describing operations of a method in accordance with features and aspects hereof to process a Persistent Reservation command with a PREEMPT service action received from a host system. Element 900 is first operable to receive the Persistent Reservation PROUT command with the PREEMPT service action code from a host system. A PREEMPT service action, as is generally known in the art, indicates a request by a SCSI-3 compliant client to preempt a previously granted Persistent Reservation granted to another SCSI-3 compliant client. For example, such preempt actions may be useful to clear a Persistent Reservation granted to another client that has unexpectedly terminated operation. Element 902 is next operable to transmit on any physical path to the storage device a Persistent Reservation PRIN command with a READ RESERVATION service action to retrieve information regarding the presently granted reservation (if any). Element 904 then transmits on any physical path to the storage device a Persistent Reservation PRIN command with a READ KEYS service action to read all presently registered keys known to the storage device. Element 906 then determines whether the presently granted Persistent Reservation (as read by operation of element 902) indicates a reservation type code of All Registrants. If so, element 912 then determines whether the original Persistent Reservation type code (encoded within the reservation key returned by operation 902) was also for an All Registrants type of reservation. If not, the received Preempt operation is completed with the Reservation Conflict status in accordance with SCSI-3 standards. If the previously granted Persistent Reservation is an All Registrants type it may only be preempted by a similar All Registrants reservation type request. If both the original reservation type code and the received reservation type code are All Registrants type, element 914 is operable to transmit on any selected physical path to the storage device a Persistent Reservation PROUT command with the PREEMPT service action using the selected path's reservation key as the requested reservation key parameter and a service action request key (SARK) of all zeros (indicating preemption of all registrants). Element 916 then transmits on the same selected path to the storage device a Persistent Reservation PROUT command with a service action to REGISTER AND IGNORE EXISTING KEY. The reservation key parameter is a generated key as discussed above. Element 918 then transmits on each other (not selected) physical path to the storage device a Persistent Reservation PROUT command with a REGISTER service action supplying a generated key as discussed above for the reservation key parameter. Thus, elements 914 to 918 effectively emulate the requested preemption of All Registrants and restore the reservation keys for all paths between the requesting host system and the storage device. Element 930 is then operable to disable further I/O filtering for all physical paths to the storage device in view of the emulation of the present granted Persistent Reservation.

If element 906 determines that the present reservation type code is not for an All Registrants type of reservation, element 908 is iteratively operable for each registration key returned by the read keys operation of element 904. For each such registration key where the application portion of the generated key matches the application portion of the received service action request reservation key (SARK received in the request of element 900), an appropriate Persistent Reservation PROUT with PREEMPT service action is generated and transmitted. The generated PREEMPT service action is transmitted on any physical path to the storage device and supplies a reservation key parameter using the matching registration key noted above and using the service action reservation key (SARK) of the present reservation holder's key returned by operation of element 902 above. Element 910 is then operable to transmit a Persistent Reservation PROUT command with a REGISTER AND IGNORE EXISTING KEYS service action. The request is transmitted on the same physical path selected above by operation of element 908. The reservation key parameter of the PREEMPT service action is a newly generated key as discussed above. Thus elements 908 and 910 are operable to preempt only the selected reservation keys that matched the service action reservation keys supplied in received PREEMPT service action request from the host system. Element 930 is then operable to disable further I/O filtering for all physical paths to the storage device in view of the preemption of the presently granted Persistent Reservation.

PRIN Command Handling

The SCSI-3 PRIN command is used to manage persistent reservations for portions of a volume of data and/or an entire volume of data. In general, the PRIN command retrieves information from the storage device regarding persistent reservation status. A service action code parameter of the PRIN command is used to identify which of various Persistent Reservation related services are being requested. In general, a host system (i.e., application or system process) sends a PRIN (READ KEYS) service action to retrieve information regarding keys previously registered with the storage device. A READ RESERVATION service action retrieves information about the presently held reservation (if any). Another service action, REPORT CAPABILITIES, requires no special processing in accordance with features and aspects hereof to enable multiple path utilization in conjunction with Persistent Reservation SCSI-3 protocols. The command may simply be forwarded to the storage device for normal processing and returned data may be forwarded directly tot eh requesting host system.

As discussed above, features and aspects hereof emulate the operation of exclusive type reservations. Only non-exclusive reservation requests are actually sent to the storage device. Thus, all of the multiple paths between a host system and a storage device may be used to improve performance and reliability despite the use of persistent reservation protocols. Features and aspects hereof, as noted above, therefore also translate information returned by PRIN service actions to emulate the return of information expected by the host system to provide the desired exclusivity. Thus features and aspects hereof emulate the desired exclusivity by intercepting PRIN commands and translating the information returned from the storage device to provide desired exclusivity as well as the desired improvements enabled by multiple paths between a host system and a storage device. FIGS. 10 and 11 are flowcharts describing processing associated with features and benefits features and aspects hereof for processing Persistent Reservation PRIN commands received from the host system. In general, PRIN commands retrieve reservation and registration information from the storage device. The reservation keys and registration keys so returned are translated in accordance with the encoding and decoding generation features for key generation as discussed above.

In particular, FIG. 10 is a flowchart describing processing associated with features and aspects hereof to process a received Persistent Reservation PRIN command with a READ KEYS service action. Element 1000 is operable to receive the PRIN Persistent Reservation command having a READ KEYS service action. Element 1002 is next operable to transmit the Persistent Reservation PRIN command with a READ KEYS service action over any physical path to the storage device and to receive the returned list of registered keys. Element 1004 is next operable to determine if the returned list of key information is an empty list (i.e., no registered keys are presently known to the storage device). If so, element 1008 is operable to return an empty list of known keys with a copy of the PRgeneration information received from the storage device in response to operation element 1002 above. In essence, the Read Keys empty list returned by element 1002 is forwarded back to the requesting host system. If element 1004 determines that some keys were returned in response to operation of element 1002, element 1006 is next operable to translate the returned key information so as to merge returned reservation keys associated with the same host system into a single key value. Since each path of multiple paths is registered by operation of the methods discussed above, multiple registered keys are returned despite a host request to register a single key. For each returned key received in the list from operation of element one of 1002, the host ID field in the generated portion key is compared to the host ID portion of each other returned, generated key. For all key values indicating the same host ID, a single generated key value is returned in the list constructed for return to the requesting host system. Lastly the PRgeneration information received from the storage device is added to the list for return to the requesting host system.

FIG. 11 is a flowchart describing processing associated with features and aspects hereof relating to receipt of a Persistent Reservation PRIN command with a READ RESERVATION service action. Element 1100 is first operable to receive the PRIN Persistent Reservation command with a READ RESERVATION service action from the host system. Such a request seeks information regarding the current persistent reservation holder known to the storage device. Element 1102 is then operable to essentially forward the received PRIN READ RESERVATION service action request to the storage device and to receive the returned information from the storage device. Element 1104 then determines whether the returned information is an empty list. If so, element 1108 is operable to return to the host system the empty list including the PRgeneration information received from the storage device. If not, element 1106 is operable to translate the returned reservation information using portions of the returned information and replacing the reservation type code in the returned reservation key with the original persistent reservation type code encoded within the returned reservations key (i.e., the OPRTC field encoded in the returned, generated reservation key). Thus, the non-exclusive reservation type code provided in the returned information may be replaced with the exclusive or non-exclusive type code originally requested by the reservation holder. The returned information therefore reflects the reservation type code originally generated by the host system rather than the translated reservation type code provided to the storage device in accordance with features and aspects hereof.

I/O Filtering

As noted above, features and aspects hereof emulate the operation of exclusive type persistent reservations by using only non-exclusive reservation types sent to the storage device. The desired exclusivity is therefore emulated in accordance with features and aspects hereof. The above discussion shows emulated processing of PROUT and PRIN commands to provide the desired exclusivity of reservations while permitting all of multiple paths between a host system and a storage device to be utilized. Since the storage device is not generally aware of the desired exclusivity, an I/O filtering element emulates the requisite filtering of commands that are allowed or that need be rejected in accordance with Persistent Reservation protocols of the SCSI-3 specifications. A filtering element in accordance with features and aspects hereof therefore handles all "other" SCSI-3 commands (other than PROUT and PRIN). As noted, such a filtering element may be implemented by a suitable table lookup structure or other similar programming techniques. These filtering features and aspects may be implemented within the enhanced MPP driver.

FIG. 12 is a flowchart describing processing associated with features and aspects hereof to provide I/O filtering of other SCSI-3 commands in accordance with the intended semantic definitions of the SCSI-3 specifications for processing of SCSI-3 commands in the presence of Persistent Reservation protocols. As noted above, features and aspects hereof translate and coordinate Persistent Reservation requests associated with multiple paths of each of one or more host systems coupled to a shared storage device. The processing of FIG. 12 therefore intercepts and interprets SCSI-3 commands transmitted from the host system to the storage device through the MPP driver element and assures that the proper Persistent Reservation protocol semantic is performed by emulating appropriate Persistent Reservation behavior. Thus, SCSI-3 persisting reservation protocols may be utilized in a host system having multiple paths to a storage device while still permitting reliability and performance enhancement features in the simultaneous use of multiple paths.

Element 1200 is first operable to receive the other SCSI-3 command from a host system. As referred to herein, "other" SCSI-3 commands refer to any SCSI-3 command other than a PRIN or PROUT Persistent Reservation related commands. Element 1202 next determines whether I/O filtering is presently enabled between the requesting host system and the storage device. If not, elements 1210 and 1212 are operable to merely forward the received command to the storage device over any physical path for normal processing within the storage device and to return any status information or data received from the storage device back to the requesting host system. In essence, elements 1210 and 1212 are operable to perform normal SCSI-3 command processing when I/O filtering is presently disabled.

If element 1202 determines that I/O filtering is presently enabled, element 1204 is operable to determine appropriate handling for the received command in accordance with the present Persistent Reservation state. In accordance with table 3 discussed above, certain commands are allowed or rejected based on the type of the current reservation (if any). Processing of element 1204 may therefore include, for example, a table look up or other similar processing techniques to determine appropriate processing for the received command in view of the present Persistent Reservations status. The processing of element 1204 will therefore determine whether the receive command is allowed or should be rejected in accordance with the SCSI-3 Persistent Reservation protocol semantic. Element 1206 then determines whether the processing of element 1204 determined that the received command is to be allowed. If so, processing continues with element 1210 and 1212 as discussed above to allow normal processing of the received command by the storage device. If element 1206 and 1204 determined that the received command is to be rejected in accordance with SCSI-3 Persistent Reservation protocols and the present reservation status, element 1208 is operable to return a Reservation Conflict status for the received command to thereby complete processing of the command.

Those of ordinary skill in the art will recognize a variety of processing elements and methods to provide the desired exclusive reservation emulation features and aspects hereof. Further, those of ordinary skill in the art will recognize that features and aspects hereof may be implemented, for example, in an enhanced multiple-path enabled driver module or within any other layer of software, firmware or custom hardware circuits associated with the desired system.

While the invention has been illustrated and described in the drawings and foregoing description, such illustration and description is to be considered as exemplary and not restrictive in character. One embodiment of the invention and minor variants thereof have been shown and described. Protection is desired for all changes and modifications that come within the spirit of the invention. Those skilled in the art will appreciate variations of the above-described embodiments that fall within the scope of the invention. As a result, the invention is not limited to the specific examples and illustrations discussed above, but only by the following claims and their equivalents.

What is claimed is:

1. A system comprising:
   at least one host system wherein each host system has multiple SCSI-3 I/O adapters serving as SCSI-3 initiators for coupling the corresponding host system to a storage system and wherein the multiple SCSI-3 I/O adapters define multiple physical paths between the corresponding host system and a storage system;
   at least one process operable on each of said at least one host system wherein each process is adapted to generate a host system request to exchange information with a storage system and wherein the generated host system requests use virtual path information representing any of the multiple physical paths between the corresponding host system and a storage system without indicating a specific physical path of the multiple physical paths; and
   a multiple-path driver element configured within each of said at least one host system and coupled to each said process to map virtual path information into physical path information for a selected physical path of the multiple physical paths and wherein the multiple-path driver is further adapted to transparently coordinate SCSI-3 Persistent Reservation operations by all processes operable on all host systems of the system.

2. The system of claim 1 wherein the multiple-path driver element further comprises:
   a reservation key translation element to encode and/or decode reservation keys used by the multiple-path driver element in coordinating SCSI-3 Persistent Reservation operations wherein a translated reservation key includes a process specific portion supplied by the process and includes a generated portion generated by the reservation key translation element.

3. The system of claim 2 wherein the multiple-path driver element further comprises:
   a Persistent Reservation command processing element to process a received SCSI-3 Persistent Reservation command using a translated reservation key in coordinating SCSI-3 Persistent Reservation operations.

4. The system of claim 3 wherein the Persistent Reservation command processing element further comprises:
   a Persistent Reservation type code translation element to modify a supplied Persistent Reservation type code in the host system request to permit coordination of multiple physical paths between the corresponding host system and the storage system.

5. The system of claim 4 wherein the Persistent Reservation command processing element further comprises:
   a Persistent Reservation registration key translation element to modify the supplied Persistent Reservation registration key in a host system request to permit coordination of multiple physical paths between the corresponding host system and the storage system.

6. The system of claim 5 wherein the Persistent Reservation registration key translation element is adapted to replace a portion of the supplied Persistent Reservation registration key with a generated portion that includes:
   a host system identifier identifying the host system that generated the host system request;
   a path identifier identifying a selected physical path of the multiple physical paths corresponding to the host system request; and
   an original Persistent Reservation type code identifying the supplied Persistent Reservation type code.

7. The system of claim 1 wherein the multiple-path driver element further comprises:
   a command filter processing element to process received SCSI-3 commands, other than received SCSI-3 Persistent Reservation commands, in coordinating SCSI-3 Persistent Reservation operations.

8. The system of claim 7 wherein the command filter processing element further comprises:
   a target command filter emulation element to emulate rejection of received SCSI-3 commands by a SCSI-3 target device in accordance SCSI-3 Persistent Reservation protocols.

9. A computer readable storage medium tangibly embodying programmed instructions that when executed by a computer perform functions of an improved multiple-path driver operable in a host system for adapting application storage requests directed to a virtual path for exchange with a storage system over multiple physical paths between the host system and the storage system, the programmed instructions operable to perform an improvement of the multiple-path driver comprising:
   a Persistent Reservation command processing element to process SCSI-3 Persistent Reservation commands received from the host system and directed to a virtual path by transmitting translated Persistent Reservation commands applied to multiple physical paths of a host system; and
   a filter processing element to process other SCSI-3 commands in accordance with the translated Persistent Reservation command processing.

10. The computer readable medium of claim 9 wherein the improved multiple-path driver programmed instructions further comprise:
    a key encoding/decoding element to translate supplied persistent registration reservation key values supplied in application storage requests into generated keys exchanged with the storage system to coordinate the translated Persistent Reservation commands applied to multiple paths of a host system.

11. The computer readable medium of claim 10 wherein the key encoding/decoding element is operable to translate keys using an application portion supplied in the corresponding application storage request and using a generated portion wherein the generated portion includes:
- a host system identifier identifying the host system that generated the application storage request;
- a path identifier identifying a selected physical path of the multiple paths of the host system request; and
- an original Persistent Reservation type code identifying the Persistent Reservation type code supplied in the application storage request.

12. The computer readable medium of claim 11 wherein the Persistent Reservation command processing element further comprises:
- a Persistent Reservation command translation element associated with the key encoding/decoding element wherein the Persistent Reservation command translation element is operable to exchange exclusive-type Persistent Reservation type codes in application storage requests with corresponding non-exclusive-type Persistent Reservation type codes and is operable to encode the original Persistent Reservation type code supplied in an application storage request into the generated key.

13. The computer readable medium of claim 11 wherein the Persistent Reservation command processing element is adapted to utilize the original Persistent Reservation type code in SCSI-3 exchanges with the host system requesting the applications storage request and is further adapted to utilize the exclusive-type Persistent Reservation type codes in exchanges with the storage system.

14. A method operable in a host system having multiple physical paths coupling it to a storage system, the method comprising:
- receiving SCSI-3 commands from a process in the host system directed to the storage system over an identified path of the multiple physical paths;
- processing received SCSI-3 Persistent Reservation commands to coordinate SCSI-3 Persistent Reservation commands generated by the process applied to any of the multiple possible physical paths; and
- filtering other received SCSI-3 commands to emulate operation of the SCSI-3 Persistent Reservation protocol for all physical paths between the host system and the storage device.

15. The method of claim 14 wherein the step of processing further comprises:
- translating between a supplied Persistent Reservation registration key supplied in a SCSI-3 command received from the process and a generated key used in exchanges between a host system and a storage system.

16. The method of claim 15 wherein the step of translating further comprises:
- generating a generated key from an application portion of a supplied Persistent Reservation registration key and from a generated portion wherein the generated portion includes:
- a host system identifier identifying the host system that generated the SCSI-3 command;
- a path identifier identifying a selected physical path of the multiple paths of the host system request; and
- an original Persistent Reservation type code identifying the Persistent Reservation type code supplied in the received SCSI-3 command.

17. The method of claim 16 wherein the step of processing further comprises:
- receiving a SCSI-3 PROUT command from the process;
- translating the supplied Persistent Reservation registration key into the generated key;
- substituting the generated key in the SCSI-3 PROUT command;
- converting an original service type code in the SCSI-3 PROUT command from an exclusive service type code to a corresponding non-exclusive service type code; and
- forwarding the SCSI-3 PROUT command modified by the substitution and conversion to the storage system.

18. The method of claim 17 wherein the step of processing further comprises:
- substituting exclusive Persistent Reservation service code types for non-exclusive service code types in received SCSI-3 Persistent Reservation commands; and
- forwarding received SCSI-3 Persistent Reservation commands with the substituted service code type to the storage system.

19. The method of claim 16 wherein the step of processing further comprises:
- receiving a SCSI-3 PRIN command from the process;
- translating the supplied Persistent Reservation registration key into the generated key;
- substituting the generated key in the SCSI-3 PRIN command;
- forwarding the SCSI-3 PRIN command modified by the substitution to the storage system;
- receiving the requested information from the storage system;
- converting the received information according to the substituted key information; and
- returning the converted information to the process.

* * * * *